(12) United States Patent
Huang et al.

(10) Patent No.: US 12,104,910 B2
(45) Date of Patent: Oct. 1, 2024

(54) SYSTEMS AND METHODS FOR INFORMABLE MULTI-OBJECTIVE AND MULTI-DIRECTION RAPIDLY EXPLORING RANDOM TREE ROUTE PLANNING

(71) Applicants: Toyota Research Institute, Inc., Los Altos, CA (US); The Regents Of The University Of Michigan, Ann Arbor, MI (US)

(72) Inventors: Jiunn-Kai Huang, Mountain View, CA (US); Yingwen Tan, Ann Arbor, MI (US); Dongmyeong Lee, Ann Arbor, MI (US); Vishnu R. Desaraju, Ann Arbor, MI (US); Jessy W. Grizzle, Ann Arbor, MI (US)

(73) Assignees: Toyota Research Institute, Inc., Los Altos, CA (US); Toyota Jidosha Kabushiki Kaisha, Toyota (JP); The Regents of the University of Michigan, Ann Arbor, MI (US)

( * ) Notice: Subject to any disclaimer, the term of this patent is extended or adjusted under 35 U.S.C. 154(b) by 193 days.

(21) Appl. No.: 17/733,654

(22) Filed: Apr. 29, 2022

(65) Prior Publication Data
US 2023/0266131 A1    Aug. 24, 2023

Related U.S. Application Data

(60) Provisional application No. 63/313,120, filed on Feb. 23, 2022.

(51) Int. Cl.
G06Q 50/40    (2024.01)
G01C 21/34    (2006.01)
(Continued)

(52) U.S. Cl.
CPC ....... *G01C 21/3446* (2013.01); *G01C 21/343* (2013.01); *G01C 21/3453* (2013.01); *G06N 3/126* (2013.01); *G06N 5/01* (2023.01)

(58) Field of Classification Search
CPC .............. G01C 21/3446; G01C 21/343; G01C 21/3453; G01C 21/34; G06N 3/126;
(Continued)

(56) References Cited

U.S. PATENT DOCUMENTS

2003/0084011 A1\*   5/2003   Shetty .................. G06Q 10/047
                                                                706/13
2010/0114338 A1    5/2010   Bandyopadhyay et al.
(Continued)

FOREIGN PATENT DOCUMENTS

| CN | 107065865 A | 8/2017 |
| CN | 109211242 A | 1/2019 |
| CN | 110275528 A | 9/2019 |

OTHER PUBLICATIONS

Zhang et al., "Energy-efficient path planning for a single-load automated guided vehicle in a manufacturing workshop," Aug. 2021 (Year: 2021).\*

(Continued)

*Primary Examiner* — Adam R Mott
*Assistant Examiner* — Byron Xavier Kasper
(74) *Attorney, Agent, or Firm* — Dinsmore & Shohl LLP

(57) ABSTRACT

A method includes inputting a source into a weighted and undirected graph having a plurality of nodes and edges, inputting a target, inputting a plurality of objectives, searching the graph using a rapidly exploring random tree algorithm to determine a solution path that meets an existence constraint and an order constraint, determining a plurality of paths between the source and the target that intersects with each one of the plurality of objectives at least once that
(Continued)

conforms with the existence constraint, assigning a travel cost for each of the determined plurality of paths, determining a visiting order of the plurality of objectives that reduces the assigned travel cost by the RRT* algorithm asymptotically decreasing with an allocated computation time by rewiring each one of the plurality of objectives and outputting the solution path to form a connected graph having the plurality of nodes.

20 Claims, 18 Drawing Sheets

(51) Int. Cl.
 G06N 3/126 (2023.01)
 G06N 5/01 (2023.01)
 G06Q 10/047 (2023.01)
(58) Field of Classification Search
 CPC ........ G06N 5/01; G06Q 50/30; G06Q 10/047; G05B 2219/31051; B25J 9/1664; G05D 1/0214
 See application file for complete search history.

(56) References Cited

U.S. PATENT DOCUMENTS

| 2010/0114472 | A1* | 5/2010 | Oumi | G01C 21/343 701/532 |
| 2011/0106306 | A1* | 5/2011 | Kim | B25J 9/1664 901/1 |
| 2011/0113155 | A1* | 5/2011 | Kuznetsov | G01C 21/3446 709/241 |
| 2020/0061824 | A1* | 2/2020 | Pholsiri | B25J 9/1666 |
| 2020/0097014 | A1* | 3/2020 | Wang | G06Q 10/047 |
| 2022/0065633 | A1* | 3/2022 | Beaurepaire | G01C 21/343 |

OTHER PUBLICATIONS

Osanlou et al., "Optimal Solving of Constrained Path-Planning Problems wit Graph Convolutional Networks and Optimized Tree Search," Nov. 2019 (Year: 2019).*

Qureshi et al., "An Edge-wise Linear Shortest Path Algorithm for Non Negative Weighted Undirected Graphs," Dec. 2009 (Year: 2009).*

Maurović et al., "Path Planning for Active SLAM Based on the D* Algorithm With Negative Edge Weights, " Aug. 2018 (Year: 2018 ).*

Jaroslav Janoš, et al., Multi-goal path planning using multiple random trees, pp. 1-8, arXiv:2106.03407v1 [cs. RO] Jun. 7, 2021.

Kui Qian, et al., Robot path planning optimization method based on heuristic multi-directional rapidly-exploring tree, Computers & Electrical Engineering, vol. 85, Jul. 2020, 106688, pp. 1-8, Science Direct.

* cited by examiner

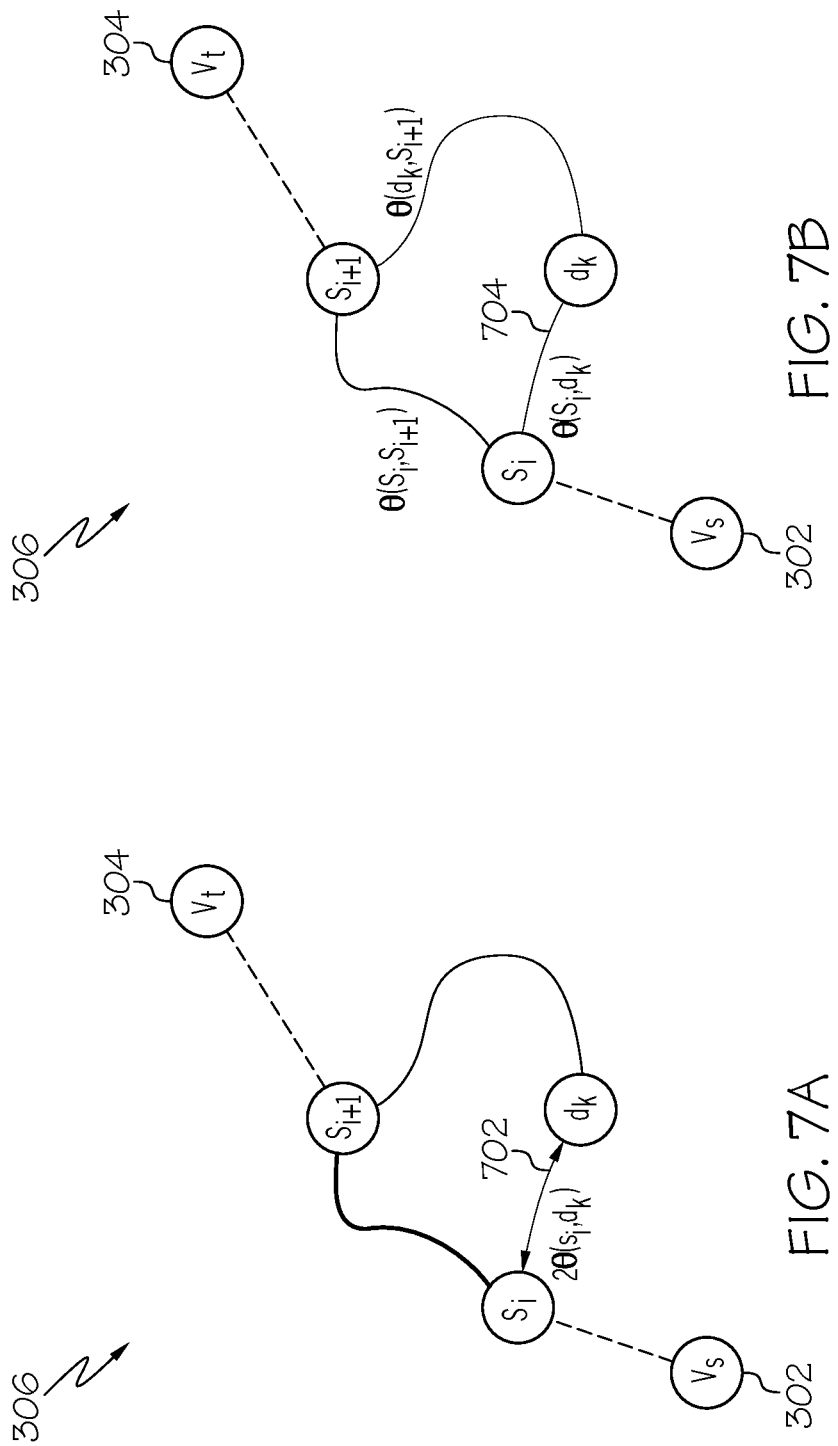

Algorithm 1: IMOMD-RRT* Algorithm

1   $\mathcal{D} \leftarrow \{v_s, v_t, \mathcal{O}\}$;
2   for *all* $d_i, d_k \in \mathcal{D}$ do
3       $\mathcal{V}(\mathcal{T}_i) \leftarrow \{d_i\}$; $\mathcal{E}(\mathcal{T}_i) \leftarrow \emptyset$;
4       $\mathcal{X}_i \leftarrow \mathcal{N}(d_i)$;
5       if $d_i = d_k$ then
6           $A_{ii} \leftarrow 0$;
7       else
8           $A_{ik} \leftarrow \infty$; $\mathcal{C}_{ik} \leftarrow \emptyset$; $C^*_{ik} \leftarrow$ None;

9   $j \leftarrow 0$;
10   while $j < N$ do
11       $x_{\text{rand}} \leftarrow \text{Sample}(\mathcal{V}(\mathcal{G}), \mathcal{D})$; $j \leftarrow j + 1$;
12       for $\mathcal{T}_i \in \mathcal{T}$ do
13           $\mathcal{T}_i, x_{\text{new}} \leftarrow \text{extendTree}(\mathcal{T}_i, x_{\text{rand}}, \mathcal{X}_i, \mathcal{G})$;
14           $\mathcal{C}, A, C^* \leftarrow$
              updateTreeConnectivity$(x_{\text{new}}, \mathcal{T}_i, \mathcal{T}, A, \mathcal{C}, C^*)$;
15       if checkGraphConnectivity$(\mathcal{C})$ then
16           $\mathcal{S} \leftarrow$ ACI-Gen solver$(A)$;
17           $\pi \leftarrow \text{Path}(\mathcal{S}, \mathcal{T}, \mathcal{C}, C^*)$;

FIG. 11

Algorithm 2: extendTree $(\mathcal{T}_i, x_{\text{rand}}, \mathcal{X}_i, \mathcal{G})$ 1. $x_{\text{new}} \leftarrow \arg\min_{x \in \mathcal{X}_i} \text{Dist}(x, x_{\text{rand}})$;
2. $\mathcal{V}(\mathcal{T}_i) \leftarrow \mathcal{V}(\mathcal{T}_i) \cup \{x_{\text{new}}\}$;
3. $\mathcal{X}_i \leftarrow (\mathcal{X}_i \setminus \{x_{\text{new}}\}) \cup (\mathcal{N}(x_{\text{new}}) \setminus \mathcal{V}(\mathcal{T}_i))$;
4. $\mathcal{Q}_i \leftarrow \mathcal{N}(x_{\text{new}}) \cap \mathcal{V}(\mathcal{T}_i)$;
5. $x_{\text{parent}} \leftarrow \arg\min_{x_{\text{near}} \in \mathcal{Q}_i} \{\text{Cost}(\mathcal{T}_i, x_{\text{near}}) + \text{Dist}(x_{\text{near}}, x_{\text{new}})\}$;
6. $\mathcal{E}(\mathcal{T}_i) \leftarrow \mathcal{E}(\mathcal{T}_i) \cup \{(x_{\text{parent}}, x_{\text{new}})\}$;
7. for $x_{\text{near}} \in (\mathcal{Q}_i \setminus \{x_{\text{parent}}\})$ do
8.     $c = \text{Cost}(\mathcal{T}_i, x_{\text{new}})$;
9.     if $\text{Cost}(\mathcal{T}_i, x_{\text{near}}) > c + \text{Dist}(x_{\text{new}}, x_{\text{near}})$ then
10.         $\mathcal{E}(\mathcal{T}_i) \leftarrow \mathcal{E}(\mathcal{T}_i) \setminus \{(\text{Parent}(\mathcal{T}_i, x_{\text{near}}), x_{\text{near}})\}$;
11.         $\mathcal{E}(\mathcal{T}_i) \leftarrow \mathcal{E}(\mathcal{T}_i) \cup \{(x_{\text{new}}, x_{\text{near}})\}$
12. return $\mathcal{T}_i, x_{\text{new}}$

FIG. 12

Algorithm 3:
updateTreeConnectivity $(x_{\text{new}}, \mathcal{T}_i, \mathcal{T}, \mathcal{A}, \mathcal{C}, \mathcal{C}^*)$ 1. for all $\mathcal{T}_k \in \mathcal{T}$ $(k \neq i)$ do
2.     if $x_{\text{new}} \in \mathcal{V}(\mathcal{T}_k)$ then
3.         $\mathcal{C}_{ik} \leftarrow \mathcal{C}_{ik} \cup \{x_{\text{new}}\}$;
4.         $C_{ik}^* = \arg\min_{c \in \mathcal{C}_{ik}} \{\text{Cost}(\mathcal{T}_i, c) + \text{Cost}(\mathcal{T}_k, c)\}$;
5.         $A_{ik} \leftarrow \text{Cost}(\mathcal{T}_i, C_{ik}^*) + \text{Cost}(\mathcal{T}_k, C_{ik}^*)$;
6. return $\mathcal{C}, \mathcal{A}, \mathcal{C}^*$;

FIG. 13

Algorithm 4: checkGraphConnectivity ($\mathcal{C}$)

1   $\mathcal{M} \leftarrow [1, \cdots, m+2]$;
2   for *all $i, k \in [1, \cdots, m+2]$ ($i < k$)* do
3      if $\mathcal{C}_{ik} \neq \emptyset$ then
4         $\mathcal{M}[\mathcal{M}[k]] = \mathcal{M}[i]$;
5         $\mathcal{M}[k] = \mathcal{M}[i]$;

6   if $\mathcal{M}[1] = \mathcal{M}[2] = \cdots = \mathcal{M}[m+2]$ then
7      return *True*;
8   else
9      return *False*;

FIG. 14

Algorithm 5: ACI-Gen Solver $(A, v_s, v_t, \mathcal{O})$

1   $\mathcal{S} \leftarrow \text{Dijkstra}(A, v_s, v_t);$
2   $\mathcal{K} \leftarrow \mathcal{O} \setminus \mathcal{S};$
3   while $\mathcal{K} \neq \emptyset$ do
4      $\lambda^*, s^*, d^* \leftarrow \text{Equation (5)}$
5      $\mathcal{S} \leftarrow \text{Execute}(\mathcal{S}, d^*, \lambda^*);$
6   $\mathcal{S}_{min} \leftarrow \text{refineSequence}(\mathcal{S});$
7   $\mathcal{F} \leftarrow \emptyset;$
8   for $k < N$ do
9      $\mathcal{S}' \leftarrow \text{Mutate}(\mathcal{S}_{min}); k \leftarrow k + 1;$
10     if $\Theta(\mathcal{S}') < \Theta(\mathcal{S}_{min})$ then
11       $\mathcal{F} \leftarrow \mathcal{F} \cup \{\mathcal{S}'\};$
12   while $\|\mathcal{F}\| \geq 2$ *and* $i < generation$ do
13     $\mathcal{F}_{new} \leftarrow \emptyset; i \leftarrow i + 1;$
14     for $j < population$ do
15       $\mathcal{S}_{\text{Parent}_A}, \mathcal{S}_{\text{Parent}_B} \leftarrow \text{Sample}(\mathcal{F});$
16       $\mathcal{S}' \leftarrow \text{Crossover}(\mathcal{S}_{\text{Parent}_A}, \mathcal{S}_{\text{Parent}_B});$
17       if $\Theta(\mathcal{S}') < \Theta(\mathcal{S}_{min})$ then
18         $\mathcal{F}_{new} \leftarrow \mathcal{F}_{new} \cup \{\mathcal{S}'\};$
19     $\mathcal{F} \leftarrow \mathcal{F}_{new};$
20     $\mathcal{S}_{min} \leftarrow \arg\min_{\mathcal{S} \in \mathcal{F}} \Theta(\mathcal{S});$
21   return $\mathcal{S}_{min};$

FIG. 15

Algorithm 6: refineSequence ($S$)

1.   $S_{\text{refined}} \leftarrow [\ ]$; $visited \leftarrow \emptyset$;
2.   $i = 0$;
3.   for $i < \text{len}(S) - 1$ do
4.       if $s_i \in visited$ then
5.           $j = i + 1$; $\texttt{refined} \leftarrow false$;
6.           while $(S_{\text{refined}}[-1], s_j)$ *are not connected*
7.           and $j <$ *last index of* $s_j$ *in* $S$ do
8.               if $s_j \notin visited$ and
9.               $(S_{\text{refined}}[-1], s_j)$ *are connected* then
10.                   $S_{\text{refined}}.\text{append}(s_j)$;
11.                   $visited \leftarrow visited \cup \{s_j\}$;
12.                   $i = j$; $\texttt{refined} \leftarrow true$
13.           if $\texttt{refined}$ then
14.               $S_{\text{refined}}.\text{append}(s_i)$;
15.               $visited \leftarrow visited \cup \{s_i\}$;
16.               $i = i + 1$;
17.       else
18.           $S_{\text{refined}}.\text{append}(s_i)$;
19.           $visited \leftarrow visited \cup \{s_i\}$;
20.   return $S_{\text{refined}}$;

FIG. 16 ure describes the drawings with reference to the following figures, wherein like numerals refer to like parts throughout the several views, and wherein:

SYSTEMS AND METHODS FOR INFORMABLE MULTI-OBJECTIVE AND MULTI-DIRECTION RAPIDLY EXPLORING RANDOM TREE ROUTE PLANNING

CROSS REFERENCE TO RELATED APPLICATIONS

This utility patent application claims priority from U.S. Provisional Patent Application Ser. No. 63/313,120 filed Feb. 23, 2022, and entitled "Imformable Multi-Objective and Multi-Directional RRT* System for Robot Path Planning", the contents of which is included herein by reference.

TECHNICAL FIELD

The present specification generally relates to methods for route planning and, more specifically, to multi-objective and multi-directional route planning using a relaxed traveling salesperson and a rapidly exploring random tree* algorithm for route planning.

BACKGROUND

It is generally known to that multi-objective or multi-destination path planning is needed for mobile robotics applications such as mobility as a service, car-pooling, food delivery, mass transportation, and electric vehicle charging for long trips. It is also known that in these services, many times the destinations change rapidly which creates problems for multi-objective or multi-destination path planning. Further, it is known that in mobile robotic applications, changing objectives or destinations happens often in practice, which requires computational time to evaluate new path planning. It is also known that conventional systems independently determine a path between start and end points or a visiting order of destinations. However, these conventional systems require a cyclic or complete graph already constructed with known weights and edges between nodes. Accordingly, a need exists for alternative methods to concurrently solve the multi-objective path planning problem and determine the visiting order of destinations in cases with there is not a cyclic or complete graph or the weight of the edges are not known.

SUMMARY

In one embodiment, method for a route path planning performed by a route planning system is provided. The method includes inputting a source into a weighted and undirected graph having a plurality of nodes and a plurality of edges, inputting a target into the weighted and undirected graph, inputting a plurality of objectives into the weighted and undirected graph, searching the weighted and undirected graph using a rapidly exploring random tree (RRT*) algorithm to determine a solution path that meets an existence constraint and an order constraint, determining a plurality of paths between the source and the target that intersects with each one of the plurality of objectives at least once that conforms with the existence constraint, assigning a travel cost for each of the determined plurality of paths, determining a visiting order of the plurality of objectives that reduces the assigned travel cost for each of the plurality of objectives by asymptotically decreasing an allocated computation time, and outputting the solution path connects the source, the target and the plurality of objectives to form a connected graph having the plurality of nodes in a real world application.

In another embodiment a route planning system is provided. The route planning system includes one or more processing devices, one or more memory modules communicatively coupled to the one or more processing devices, and machine readable instructions stored in the one or more memory modules that cause the route planning system to perform at least the following when executed by the one or more processing devices: input a source into a weighted and undirected graph having a plurality of nodes and a plurality of edges, input a target into the weighted and undirected graph, input a plurality of objectives into the weighted and undirected graph, search the weighted and undirected graph via a rapidly exploring random tree (RRT*) algorithm to determine a solution path that meets an existence constraint and an order constraint, determine a plurality of paths between the source and the target that intersects with each one of the plurality of objectives at least once, assign a travel cost for each of the determined plurality of paths, determine a visiting order of the plurality of objectives that reduces the assigned travel cost asymptotically with an allocated computation time, and output the solution path connects the source, the target and the plurality of objectives to form a connected graph having the plurality of nodes in a real world application.

In yet another embodiment, a system is provided. The system includes one or more processing devices, one or more memory modules communicatively coupled to the one or more processing devices; and machine readable instructions stored in the one or more memory modules that cause the system to perform at least the following when executed by the one or more processing devices: input a source into a weighted and undirected graph having a plurality of nodes and a plurality of edges, input a target into the weighted and undirected graph, input a plurality of objectives into the weighted and undirected graph, search the weighted and undirected graph via a rapidly exploring random tree (RRT*) algorithm where the RRT* algorithm is configured to perform a sampling by picking a random node in the graph to grow a tree for each of the plurality of objectives, by extending a node from the plurality of nodes that has a plurality of expendable nodes to determine a solution path that meets an existence constraint and an order constraint, determine, via the RRT* algorithm, a plurality of paths between the source and the target that intersects with each one of the plurality of objectives at least once, assign, via a solver, a travel cost for each of the determined plurality of paths, determine, via the solver, a visiting order of the plurality of objectives that reduces the assigned travel cost by making it possible to visit each of the plurality of objectives more than once, and output the solution path connects the source, the target and the plurality of objectives to form a connected graph to a mobile application that follows the solution path to traverse the source, the target and the plurality of objectives.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7A schematically depicts a graphical representation of a modified visiting sequence with duplicated visiting paths according to one or more embodiments shown and described herein;

FIG. 7B schematically depicts a graphical representation of a modified visiting sequence with a single visiting path according to one or more embodiments shown and described herein;

FIG. 11 schematically depicts an example algorithm for an informable multi-objective and multi-directional Rapidly-exploring Random Tree* algorithm according to one or more embodiments shown and described herein;

FIG. 12 schematically depicts an example algorithm to extend a random node according to one or more embodiments shown and described herein;

FIG. 13 schematically depicts an example algorithm to verify whether trees are connected to a new extended node according to one or more embodiments shown and described herein;

FIG. 14 schematically depicts an example algorithm to determine a graph connectivity by implementing disjoint-set data according to one or more embodiments shown and described herein;

FIG. 15 schematically depicts an example algorithm for a solver according to one or more embodiments shown and described herein;

FIG. 16 schematically depicts an example algorithm of an advanced cheapest insertion to refine the sequence or path according to one or more embodiments shown and described herein.

DETAILED DESCRIPTION

Embodiments of the present disclosure are directed to a route planning system to concurrently determine a multi-objective and multi-direction path planning and determine a visiting order of destinations. The system includes an informable multi-objective and multi-directional Rapidly-exploring Random Tree* (RRT*) algorithm to form a connected weighted-undirected graph and a solver that includes an advanced cheapest insertion and a genetic algorithm to solve the relaxed traveling salesman problem in polynomial time. Additionally, embodiments herein include determining a solution path for an ordered list of inspection waypoints often provided for robotics inspection so that the robot can preferentially examine certain equipment or area of interests such that the embodiments of the anytime iterative system inherently incorporate such knowledge and reduce the computation time and the number of explored nodes (e.g., improved efficiently).

Further, embodiments herein reuse explored information after a change of destinations to efficiently find paths connecting multiple destinations as well as to determine a visiting order of the destinations. That is, improvements over conventional systems and methods include the route planning system configured to finding paths, if they exist, that connect various destinations and assign costs to paths between destinations directly on an undirected and weighted graph where nodes and edges are destinations and paths connecting destinations, respectively, and configured to determining the visiting order of destinations that minimizes or reduce a total travel cost. The determination of the visiting order of the destinations is an improvement from conventional system in that each node may be visited multiple times.

The phrase "communicatively coupled" is used herein to describe the interconnectivity of various components of the route planning system for determining efficient routing of autonomous vehicle and robotic applications and means that the components are connected either through wires, optical fibers, or wirelessly such that electrical, optical, and/or electromagnetic signals, data, and/or the like, may be exchanged between the components. It should be understood that other means of connecting the various components of the system not specifically described herein are included without departing from the scope of the present disclosure.

Figure 1:
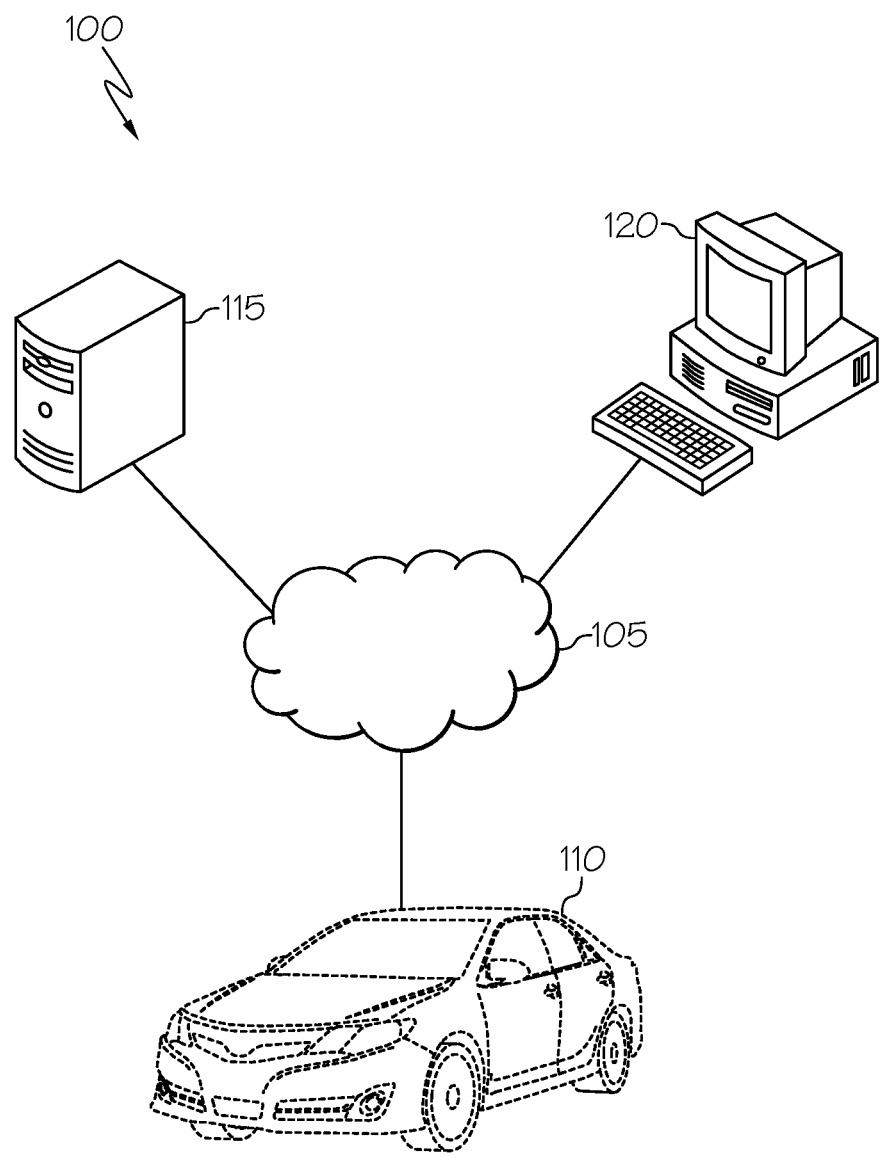
FIG. 1 schematically depicts an illustrative network having components for a route planning system according to one or more embodiments shown or described herein.

Referring now to the drawings, FIG. 1 depicts an illustrative network having components for a route planning system 100 according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, vehicular and/or robotics application devices 110, illustrated as a vehicle, a server computing device 115, and a user computing device 120.

The vehicular and/or robotics application devices 110 may generally be any vehicle, such as autonomous vehicles configured for car-sharing, carpooling, and/or the like, and/or vehicles that need charging, any movable robotic, stationary robotics that may have arms or other movements that articulate, and/or the like. In some embodiments, the vehicular and/or robotics application devices 110 may include an image capturing device 125 and/or one or more sensors 126 communicatively coupled to one or more onboard computing devices, particularly computing devices that contain hardware for processing data, storing data, capturing images in or around the vehicular and/or robotics application devices 110, and detecting objects such as other vehicles, robots, or pedestrians near or around the vehicular and/or robotics application devices 110. As such, the vehicular and/or robotics application devices 110 and/or components thereof may perform one or more computing functions, such as receiving data, for example a sequence of routes to meet certain objectives or destinations, storing the destinations and the destination visiting order, and traversing terrain to go to the destinations following the solution path in the visiting order provided, moving arms or joints such as those in stationary robotic applications following the solution path in the visiting order provided, and/or the like, as described in greater detail herein.

The server computing device 115 may receive data from one or more sources, generate data, store data, index data, search data, and/or provide or produce data to the user computing device 120 and/or the vehicular and/or robotics application devices 110 (or components thereof). In some embodiments, the server computing device 115 may employ one or more algorithms that are used for the purposes of analyzing data, such as determining the route for the vehicular and/or robotics application devices 110 and directing the vehicular and/or robotics application devices 110, as described in greater detail herein. For example, the IMOMD-RRT* algorithm, illustratively depicted in FIG. 11 may be stored on or used by the server computing device 115 to form a connected weighted-undirected graph 300 (FIGS. 3A-3D) and to reuse an explored tree after a change of destinations, and a solver, illustratively depicted in FIG. 15, that includes an advanced modified cheapest insertion algorithm and a genetic algorithm, such as an ACI-Gen solver, to solve the visiting order known herein as a relaxed traveling salesperson problem ("R-TSP"), as discussed in greater detail herein.

For example, the server computing device 115 may be used to produce data, such as a connected graph 402 (FIG. 4B) which includes a solution path 404 (FIG. 4B) that reduces an assigned travel cost asymptotically with an allocated computation time by making it possible to visit each of the plurality of objectives more than once and conforms with the order constraint, as discussed in greater detail herein. Such a determination is transmitted to or used to control the sent to the vehicular and/or robotics application devices 110.

The user computing device 120 may generally be used as an interface between a user and the other components connected to the computer network 105. Thus, the user computing device 120 may be used to perform one or more user-facing functions, such as receiving one or more inputs from a user or providing information to the user, as described in greater detail herein. Accordingly, the user computing device 120 may include at least a display and/or input hardware, as described in greater detail herein. In the event that the server computing device 115 requires oversight, updating, and/or correction, the user computing device 120 may be configured to provide the desired oversight, updating, and/or correction. The user computing device 120 may also be used to input additional data into a corpus of data stored on the server computing device 115. For example, the user computing device 120 may contain software programming or the like that relates to viewing, interpreting, gathering, and/or editing graphs, downloading specific graphs, as well as software programming that relates to real and synthetic data sets. In a non-limiting example, datasets may include a synthetic, toy LA-CATER, a realistic synthetics PD dataset, and a real-world, multi-object tracking KITTI dataset, and/or the like.

It should be understood that while the user computing device 120 is depicted as a personal computer and the server computing device 115 is depicted as a server, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user computing device 120 and the server computing device 115 may represent a plurality of computers, servers, databases, components, and/or the like.

Figure 2:
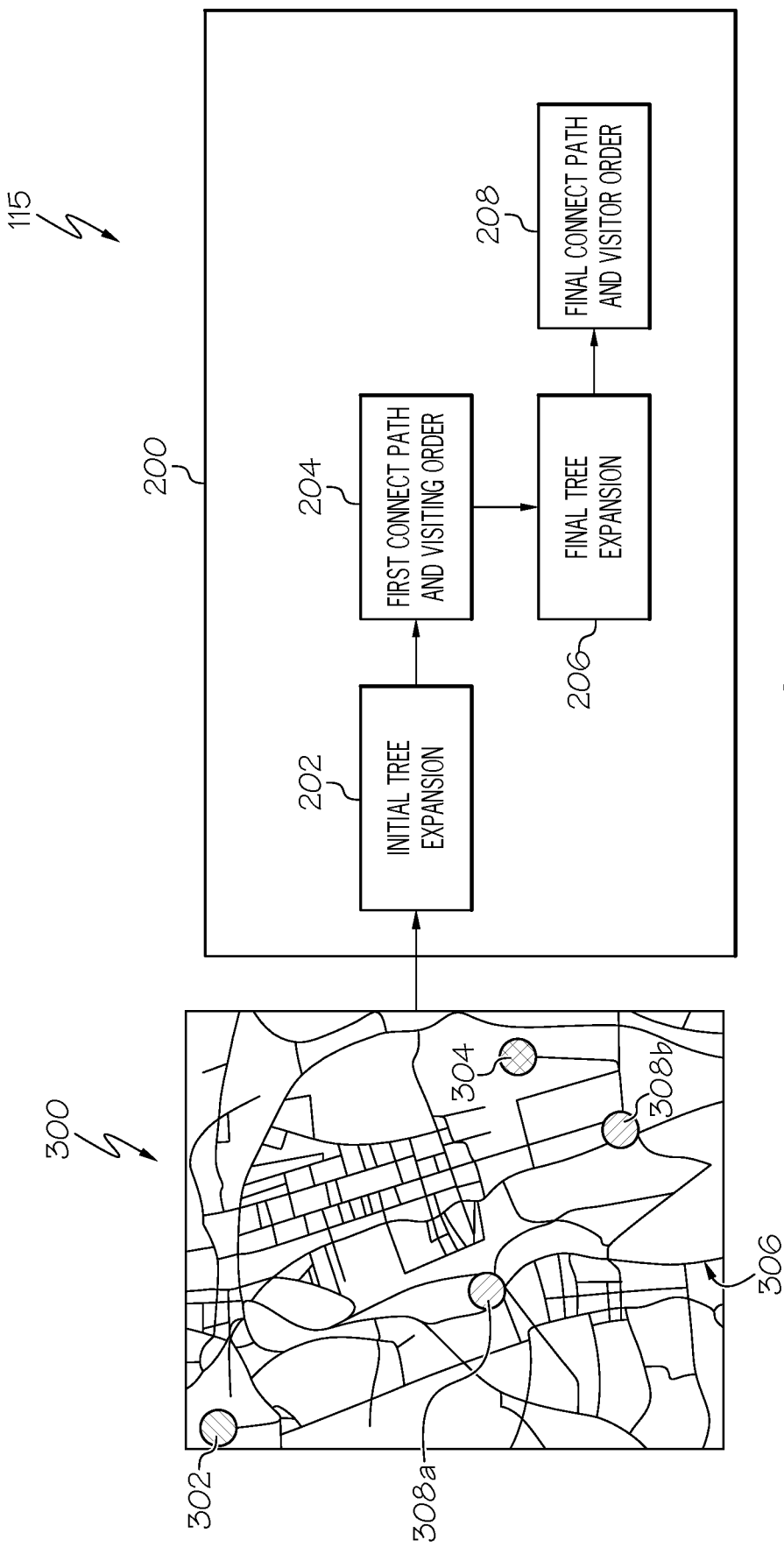
FIG. 2 schematically depicts an illustrative block diagram of an informable multi-objective and multi-directional Rapidly-exploring Random Tree* algorithm and a solver for determining a path according to one or more embodiments shown or described herein.
Figure 4A:
FIG. 4A schematically depicts a graphical representation of an example graph with a tree expansion according to one or more embodiments shown or described herein.
Figure 4B:
FIG. 4B schematically depicts a graphical representation of an example connected graph with a solution path according to one or more embodiments shown or described herein.

Now referring to FIG. 2, a block diagram 200 incorporating blocks for both the IMOMD-RRT* algorithm and the solver that work in conjunction and continuously to determine a solution path 404 in a connected graph 402 (FIG. 4B)

that reduces an assigned travel cost asymptotically with an allocated computation time by making it possible to visit each of the plurality of objectives more than once and conforms with the order constraint, as discussed in greater detail herein, is schematically depicted. The route planning system 100 and/or the server computing device 115 may include the requisite hardware, software, and/or firmware to execute the solver and the IMOMD-RRT* algorithm to form the weighted, connected and undirected graphs, as depicted in 3A-3D and the connected graph 402 with the solution path 404 as illustrated in FIG. 4B. The solver includes an advanced cheapest insertion algorithm and the genetic algorithm, and is configured to solve the relaxed traveling salesman problem (R-TSP) in polynomial time, as illustrated by example Algorithm 5 illustratively depicted in FIG. 15, and as discussed in greater detail herein.

Figures 3A, 3B:
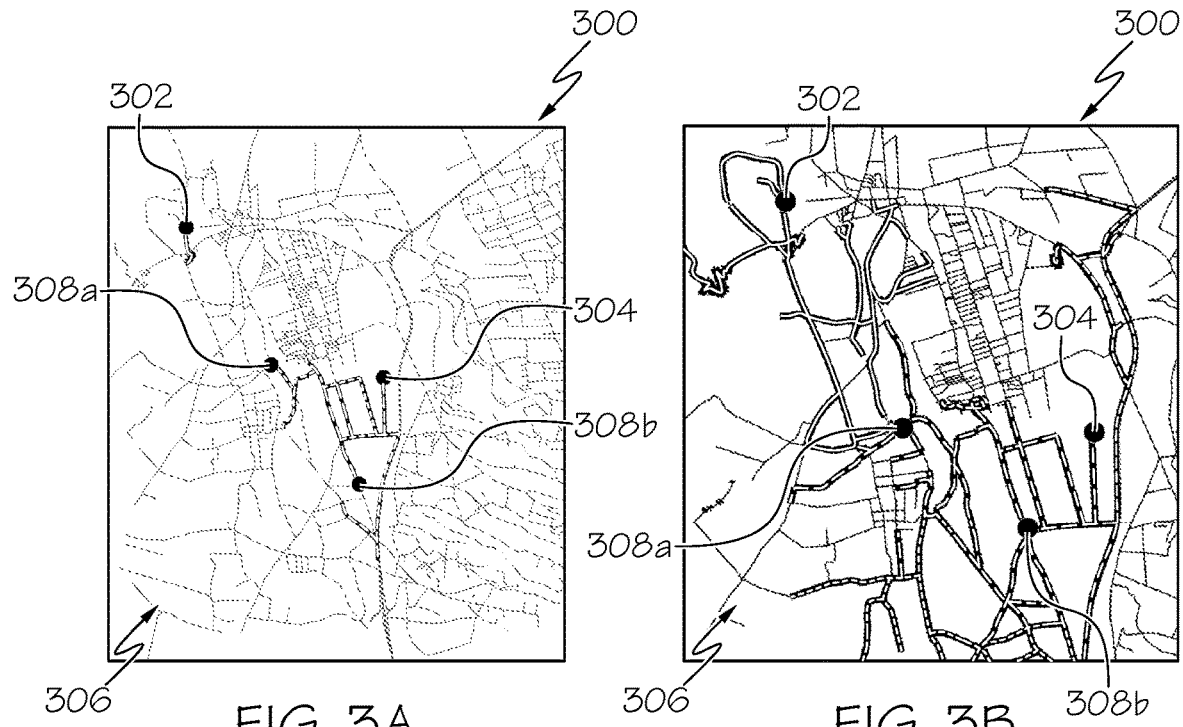
FIG. 3A schematically depicts a graphical representation of an example graph having a plurality of nodes and a plurality of edges with an initial tree expansion according to one or more embodiments shown or described herein.
FIG. 3B schematically depicts a graphical representation of the example graph of FIG. 3A with a final tree expansion according to one or more embodiments shown or described herein.

The IMOMD-RRT* algorithm, as illustrated by example Algorithm 1 illustratively depicted in FIG. 11, is configured as an efficient data structure and searching algorithm to quickly search on large-scale connected weighted-undirected graph 300 depicted in FIGS. 3A-3D. For example, to represent multiple destinations, graphs composed of nodes and edges stand out for their sparse representations. In particular, graphs are a popular representation of topological landscape features, such as terrain contour, lane markers, or intersections. Topological features do not change often and as such, they are maintainable and suitable for long-term support compared to high-definition (HD) maps. Graph based maps such as OpenStreetMap® (OSM) are known to describe topological features and are readily available worldwide. As such, the large-scale connected weighted-undirected graph 300 described herein with respect to FIGS. 3A-3D may include a source 302 or starting point, a target 304 or ending point, and a plurality of objectives 306, or destinations. For example, the graph 300, as depicted in FIG. 3A includes the source 302, the target 304 and two destinations 308a, 308b positioned between the source 302 and the target 304. As used herein, the term "objective" and the term "destination" may be used interchangeably without limiting or departing from the scope of the disclosure.

As depicted in FIGS. 3A-3D, the graph 300 may be a real time topological map of an urban environment, that contains a plurality of nodes and edges. As such, the graph 300 is weighted and undirected and includes a plurality of nodes and a plurality of edges. It should be appreciated that the graph 300 may be a real time map or graph of any environment in which the vehicular and/or robotics application devices 110 may traverse or be used within such as a stationary robot that has arms that articulate within a factory or an autonomous or hybrid vehicle that navigates roads. Further, the graph 300 may be a large and complex graph. In some embodiments, the graph 300 may be downloaded from OSM. In other embodiments, Google® maps or other sources may be used. In other embodiments, the graph 300 may be real-world map built from autonomous vehicles and/or vehicle-to-vehicle communications and global positioning technologies. Additionally, the use of OSM may be used such that prior knowledge is provided as a number of random samples in the IMOMD-RRT* algorithm as a prior collision-free path in the graph 300. The known prior path is then being rewired by the IMOMD-RRT* algorithm to improve the path, as discussed in greater detail herein.

Figures 3C, 3D:
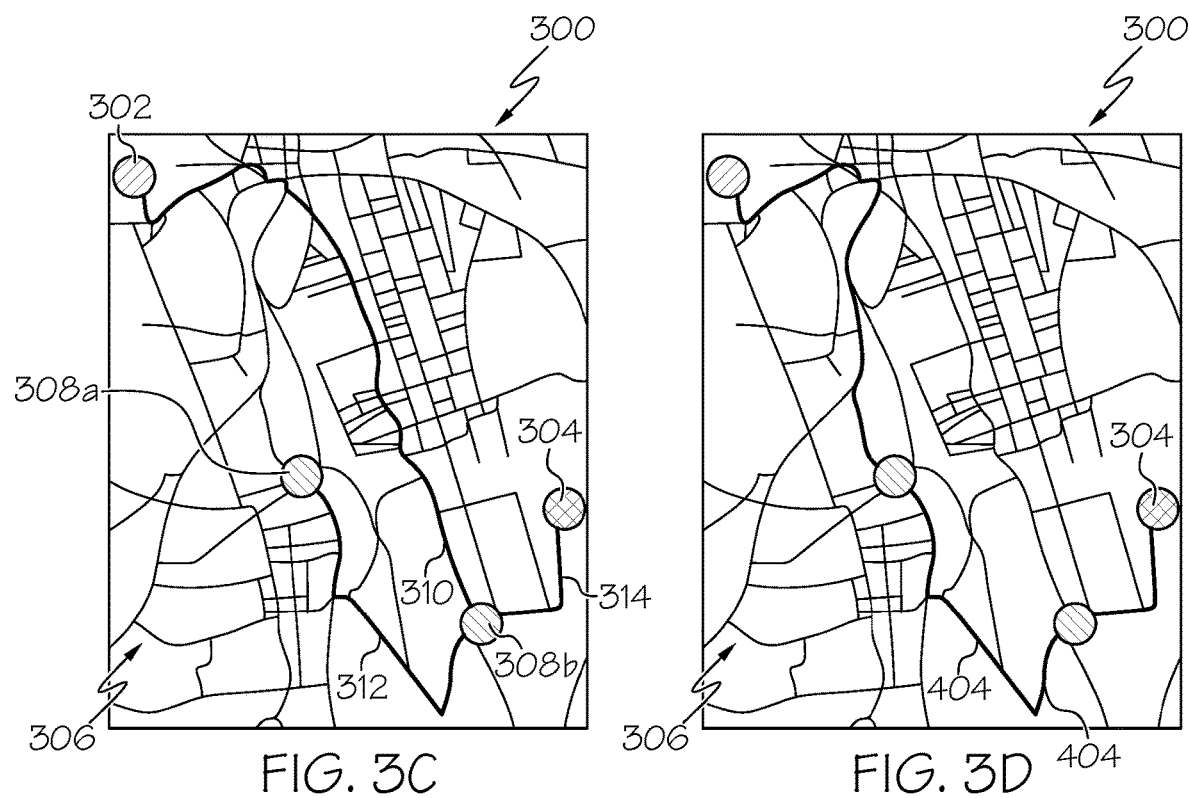
FIG. 3C schematically depicts a graphical representation of the example graph of FIG. 3A with a connected path and an initial visiting order.
FIG. 3D schematically depicts a graphical representation of the example graph of FIG. 3A with a final path and a final visiting order.

Still referring to FIG. 2, the block diagram 200 provides a brief overview of the IMOMD-RRT* algorithm and solver. Greater detail of the IMOMD-RRT* algorithm and solver will be discussed below. In brief, the IMOMD-RRT* algorithm, illustratively depicted as Algorithm 1 in FIG. 11, first has an initial tree expansion, illustrated by block 202, and schematically depicted in at least FIG. 3A. The IMOMD-RRT* algorithm creates at least a first path connecting at least one destination of the plurality of destinations 306 to either other destinations or to the source 302 and/or target 304, illustrated by block 204, and schematically depicted in at least FIG. 3C. FIG. 3C illustrates multiple paths 310, 312, 314 connecting the plurality of objectives 306 (e.g., objectives 308a, 308b), the source 302, and the target 304. The IMOMD-RRT* algorithm then performs a final tree expansion, at block 206, to determine whether additional nodes or destinations may be merged with the currently known or visited trees or destinations, as illustrated by nodes 406 and tree growth 408 directly on a topographical map 400 depicted in FIG. 4A.

The solver, illustratively depicted as Algorithm 5 in FIG. 15, determines the solution path 404 connecting the source 302, the target 304 and each of the plurality of objectives 306 (e.g., objectives 308a, 308b) with the best path or route, at block 208, and depicted in FIGS. 3D with a solution path 404 and on the connected graph 402 depicted in FIG. 4B. As such, the solver determines the visiting order of the plurality of nodes in the graph 300 in a polynomial time to formulate or determine the solution path 404, as discussed in greater detail herein.

Once all the plurality of destinations 306 are connected, the IMOMD-RRT* algorithm forms the connected graph 402 where there exists a path that passes all destinations 306. The connected graph 402 is formed when all the destinations and the paths found by the IMOMD-RRT* algorithm forms the connected graph 402, which may mean starting from any objective, for example 308a, it is possible to reach any other destination such as the target 304.

As such, the IMOMD-RRT* algorithm may be configured to quickly search on large-scale undirected weighted graphs such as the graph 300 discussed above, that meets the existence constraint and the order constraint. It should be understood that the existence constraint may mean that the solution trajectory must pass by each of the plurality of objectives 306 (e.g., objectives 308a, 308b), at least once. Further, it should be understood that the order constraint may mean that there is the source 302 or starting point is fixed and that the target 304 or ending point is also fixed. The IMOMD-RRT* algorithm creates the connected graph 402 containing the plurality of objectives 306, the source 302, and the target 304 and the solver determines the solution path 404 connecting the source 302, the target 304 and each of the plurality of objectives 306 (e.g., objectives 308a, 308b). Further, the solver determines the visiting order of the plurality of nodes in the graph 300 in a polynomial time, as discussed in greater detail herein.

As discussed in greater detail herein, in summary, the graph of the map and the destinations are input and the IMOMD-RRT* algorithm, which in turn generates spanning trees rooted for each destination. A random node is then selected and the nearest node is chosen and expanded for each tree. The path is rewired if a better path is found and the best connection mode and distance matrix is updated. The route planning system 100 then determines whether the graph is connected, meaning is there a path connected the source, target and all the plurality of destinations. If not, then the route planning system 100 returns to IMOMD-RRT* algorithm generating spanning trees and continues through the IMOMD-RRT* algorithm. When the graph is connected, then the weighted reduced graph is applied to the solver to determine the visiting order of the destination and the solution path 404.

Conventional RRT* algorithms in conventional systems use a sampling base, incremental planner with guaranteed asymptotic optimality in continuous configuration space. In general, conventional RRT* algorithms grow a tree where leaves are states connected by edges of linear path segments with the minimal cost. Additionally, conventional RRT* algorithms consider nearby nodes of a newly extended node to choose the best parent node and to rewire the graph if shorter path is possible to guarantee asymptotic optimality.

Figure 5B:
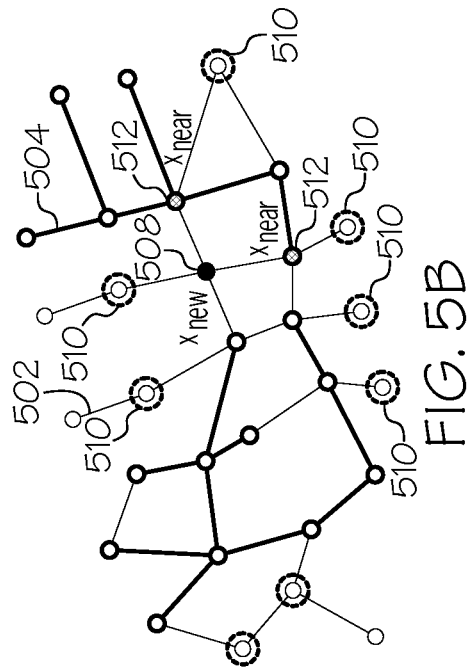
FIG. 5B schematically depicts a graphical representation of the graph of FIG. 5A with updated expandable nodes and rewiring after extending the tree according to one or more embodiments shown and described herein.
Figure 5A:
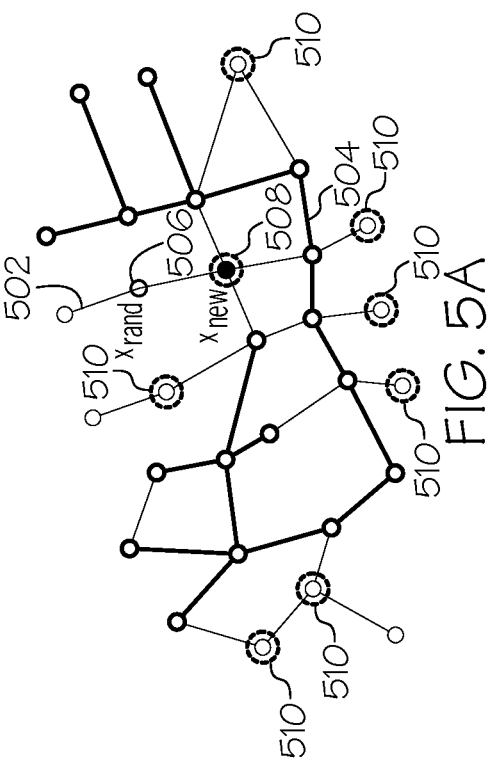
FIG. 5A schematically depicts a graphical representation of an example tree expending into a random node according to one or more embodiments shown and described herein.

Now referring to FIGS. 2, 3A-3D, 4A-4B, and 5A-5D, the IMOMD-RRT* algorithm disclosed herein differs from conventional RRT* algorithms in several aspects including a sampling is performed by picking a random node $x_{rand}$ in the nodes of a given graph and not from the continuous space. As such, the goal bias is not only applied to the target but also the source and all the objectives. Secondly, the steering directly finds the closest expandable node as $x_{new}$ to the random node $x_{rand}$, without finding the nearest node. Third, the parent node is chosen from the nodes connected with the new node $x_{new}$, herein referred to as neighbor nodes. Among the neighbor nodes, the node that makes the new node $x_{new}$ have the lowest path cost from the root becomes the new node's parent. Fourth, the IMOMD-RRT* algorithm rewires the neighbor nodes to minimize the accumulated cost from the root of a tree to the new node $x_{new}$. Lastly, if the new node $x_{new}$ belongs to more than one tree, this node is considered a connection node, which connects the path among destinations and the associated trees connected are stored in the data storage device 916 (FIG. 9A), as best depicted in FIGS. 5A-5B, and as discussed in greater detail herein.

For example, now referring to FIGS. 5A-5D, various stages of a tree expansion and connection checking of multiple trees is schematically depicted. FIG. 5A illustrates how the tree $T_i$ extends to the random node $x_{rand}$ by growing a leaf $x_{new}$ to the closest expandable node. The dotted lines represent expendable nodes. The unexplored paths of the graphs are the thinner lines labeled as 502 and the spanning tree is represented as the bolder line labeled with 504. The random node $x_{rand}$, is depicted by 506, the newly extended node $x_{new}$ is depicted by 508.

Figure 5D:
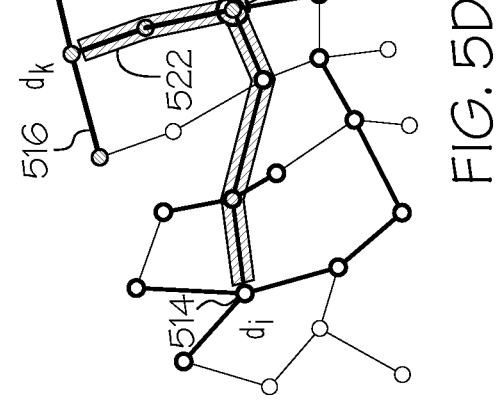
FIG. 5D schematically depicts a graphical representation of the graph of FIG. 5C with updated connectivity between trees and the shortest path according to one or more embodiments shown and described herein.
Figure 5C:
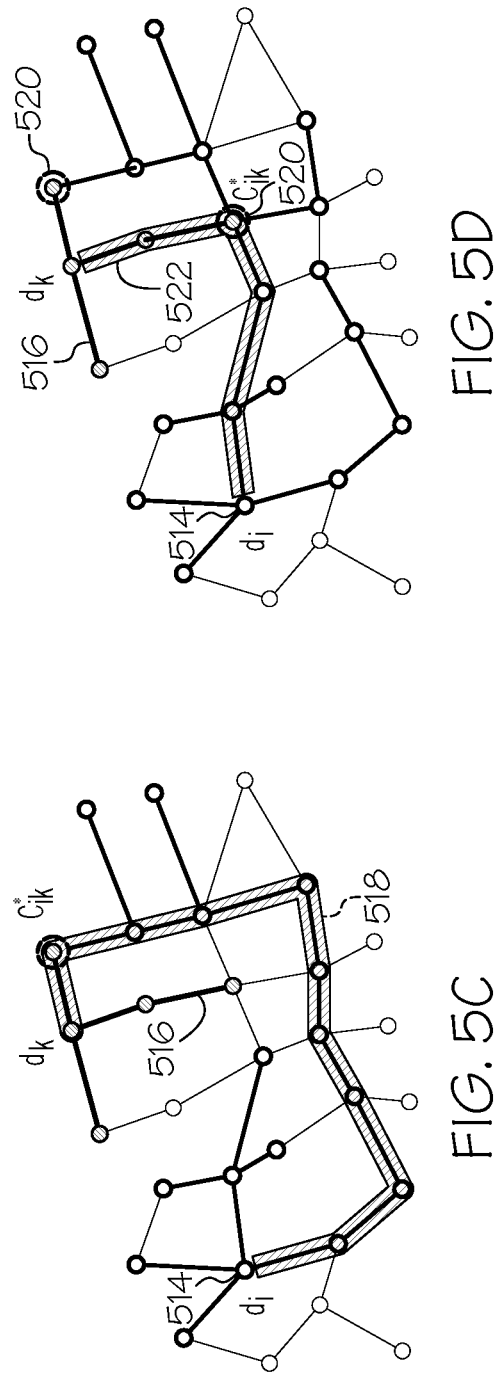
FIG. 5C schematically depicts a graphical representation of the graph of FIG. 5B with updated connectivity between trees according to one or more embodiments shown and described herein.

FIG. 5B schematically illustrates the updated expandable nodes $X_i$, depicted by 510, and tree rewired after extending the tree around the newly extended node $x_{new}$ depicted by 508. The rewired nodes $x_{new}$ are represented with dot depicted by 512. FIGS. 5C-5D schematically illustrate the updating connectivity of two trees $T_i$ and $T_k$ rooted at $d_i$ and $d_k$ and depicted as 514 and 516, respectively. For example, two trees 514, 516 rooted at $d_i$ and $d_k$ and the shortest path between the root of trees $d_i$ and $d_k$ is illustrated by path 518. The newly extended node $x_{new}$ is added to a set of connection nodes $C_{ik}$, depicted as 520. The element of distance matrix $A_{ik}$ and the connection node $C_{ik}^*$ that generates the shortest path between the destination $d_i$ and $d_i$ are updated as a shorter path is found, depicted as 522.

Referring still to FIGS. 5A-5D and now back to FIGS. 3A-3D and 4A-4B, and the example Algorithm 1, illustratively depicted in FIG. 11, the IMOMD-RRT* algorithm is graph based that generally follows graph theory. For example, a graph $\mathcal{G}$ is an ordered triple ($\mathcal{V}(\mathcal{G})$, $\varepsilon(\mathcal{G})$, $\psi_\mathcal{G}$), where $\mathcal{V}(\mathcal{G})=\{v=(\zeta, \eta)|\zeta, \eta \in \mathbb{R}\}$ is a set of nodes containing a latitude $\zeta$ and a longitude $\eta$, $\varepsilon(\mathcal{G})$ is a set of edges (disjoint from $\mathcal{V}(\mathcal{G})$), and an indication function $\psi_\mathcal{G}$ that associates each edge of $\mathcal{G}$ with an unordered pair (not necessarily distinct) of nodes of $\mathcal{G}$. Given a set of destinations $\mathcal{D}=\{d_i| d_i \in \{v_s, v_t\} \cup \mathcal{O}\}$ where $v_s \in \mathcal{V}(\mathcal{G})$ is the source node, $v_t \in \mathcal{V}(\mathcal{G})$ is the target node, and $\mathcal{O} \subseteq \mathcal{V}(\mathcal{G})$ is the set of m objectives, the IMOMD-RRT* algorithm solves the multi-objective planning problem by growing a tree $\mathcal{T}_i=(V, E)$, where $V \subseteq \mathcal{V}(\mathcal{G})$ is a vertex set of position connected by edges $E \subseteq \varepsilon(\mathcal{G})$ at each of the plurality of destinations 306 $d_i \in \mathcal{D}$. Thus, it leads to a family of trees $\mathcal{T}=\{\mathcal{T}_1, \ldots \mathcal{T}_m, \mathcal{T}_{m+1}, \mathcal{T}_{m+2}\}$.

The IMOMD-RRT* algorithm, explores the graph $\mathcal{G}$ by random sampling in graph $\mathcal{V}(\mathcal{G})$ and extending nodes to grow each tree at each of the plurality of destinations 306 or objectives by extending a node from expendable nodes in graph $\mathcal{V}(\mathcal{G})$, as best illustrated in FIGS. 3A-3B and 4A. With respect to tree expending, let $\mathcal{N}(v)$ be the set of nodes connected with a node v, (e.g., the neighborhood of node v). A node may be expendable if there exists at least one unvisited node connected and at least one node of the tree connected, as illustrated by the expandable nodes $X_i$ 510 in FIG. 5A. For example, let $\mathcal{X}_i$ be the expandable nodes of tree $\mathcal{T}_1$. The random node $x_{rand}$ is sampled from the vertices of the graph $\mathcal{V}(\mathcal{G})$. The closest expandable node or nearest node $x_{new}$ is in the set of expandable nodes $\mathcal{X}_i$ such that a Euclidean distance is defined by Equation 1:

$$x_{new} = \underset{x \in \mathcal{X}_i}{\arg \min} \ Dist(x, x_{rand}) \qquad (1)$$

where Dist (•, •) is the haversine distance.

The jumping point search algorithm may be utilized to speed up the tree expansion where if the rewired nodes $X_{new}$, have only two neighbors, the node will be moved to the next expendable node that has at least three neighbors.

With respect to parent choosing, let the set $Q_i$ be the neighborhood of the closest expandable node or nearest node $x_{new}$ in the tree $\mathcal{V}(\mathcal{T}_1)$. A node $x_{near}$ in the neighborhood $Q_i$ that results in the smallest cost-to-come cost of the parent of the closest expandable node or nearest node $x_{new}$ and is determined by Equation 2:

$$x_{parent} = \underset{x_{near} \in Q_i}{\arg \min} \ \{\text{Cos } t(\mathcal{T}_i, x_{near}) + Dist(x_{near}, x_{new})\} \qquad (2)$$

All of the unvisited nodes in the set $Q_i$ are added to the set of expandable nodes $\mathcal{X}_i$, when executed by example Algorithm 2 illustratively depicted in FIG. 12.

After a parent candidate is chosen, the nearby nodes are rewired if shorter paths reaching the nodes through the closest expandable node or nearest node $x_{new}$, are found when executed by Algorithm 2, illustratively depicted in FIG. 12 and graphically illustrated in FIG. 5B. It should be appreciated that the rewiring step may provide asymptotic optimality.

A node is a connection node if it belongs to more than one tree. Let $C_{ik}$ be the set of connection nodes between $\mathcal{T}_i$ and $\mathcal{T}_k$. Denote $C_{ik}^*$ as the node that connects $\mathcal{T}_i$ and $\mathcal{T}_k$ with the shortest distance with Equation 3:

$$C_{ik}^* = \underset{c \in C_{ik}}{\arg \min} \ \{\text{Cos } t(\mathcal{T}_i, c) + \text{Cos } t(\mathcal{T}_k, c)\} \qquad (3)$$

Let $A_{(m+2)\times(m+2)}$ be a distance matrix that represents pairwise distances between the destinations, where m is the number of objectives 306. The element $A_{i,k}$ indicates the shortest path between destinations $d_i$ and $d_k$, as graphically illustrated by reference numeral 520 in FIGS. 5C and 5D. $A_{i,k}$ is computed by Equation 4:

$$A_{i,k} = \text{Cost}(\mathcal{T}_i, C_{ik}^*) + \text{Cost}(\mathcal{T}_k, C_{ik}^*) \quad (4)$$

A graph may only be connected when there is a path between each of the pair of destinations 306, as best illustrated in FIG. 4B. The graph connectivity may be sufficient condition for solving the TSP. A verification is performed on disjoint-set data structure to examine the connectivity of the graph 300, when executed by the example Algorithm 4, illustratively depicted in FIG. 14. The disjoint-set data structure may support two operations. The first operation may be to initialize an array M with index i as a value for all the destinations $d_i$, which means each tree is an independently disjoint set.

The second operation may be to update the value of $M_i$ as the smallest index of connected trees to the tree $\mathcal{T}_i$ by checking the list of set of connection nodes $C$ iteratively. To check whether the graph is connected graph is equivalent to check whether all values of M are the same with the smallest index of trees because there is a path between the tree with the smallest index and all other trees. It should also be appreciated that at the early stage of the tree expansion, sample nodes are more likely to be sampled outside of the tree. As such, this encourages tree expansion such that after the time goes, sample nodes are more likely on the expended tree. The rewiring process is executed to further improve the optimality of the path, as discussed in greater detail herein.

Figure 6A:
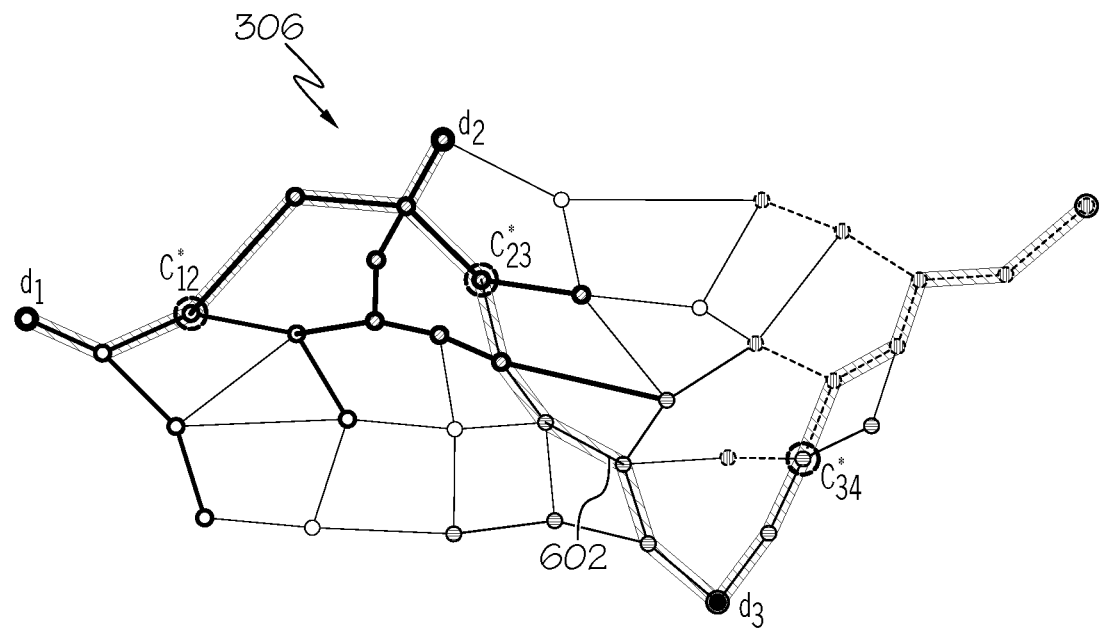
FIG. 6A schematically depicts a graphical representation of a path that has a constraint of visiting all of a plurality of objectives according to one or more embodiments shown and described herein.
Figure 6B:
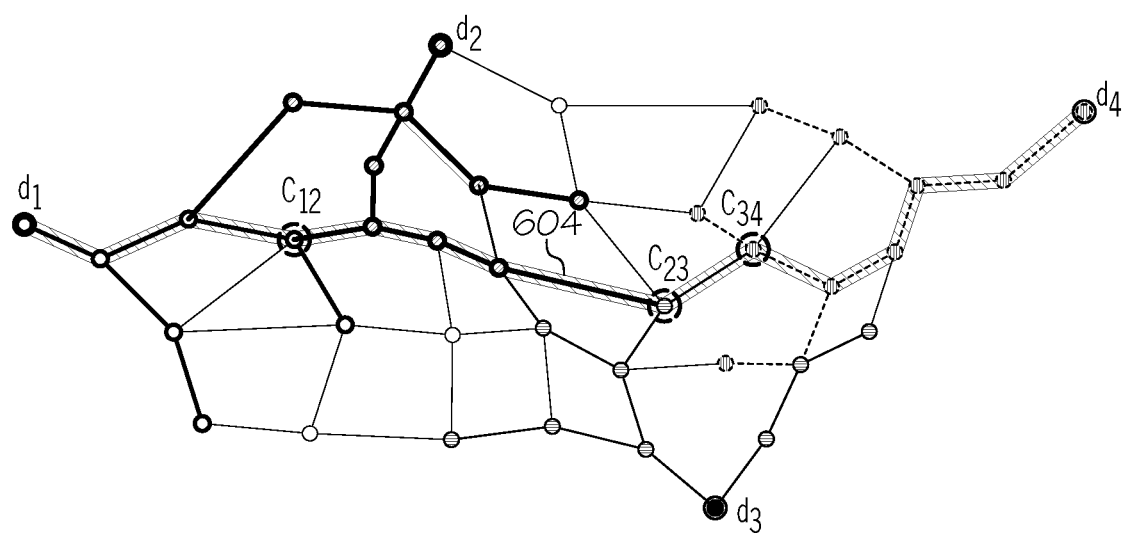
FIG. 6B schematically depicts a graphical representation of a path that includes pseudo-objectives according to one or more embodiments shown and described herein.

Referring now to FIGS. 6A-6B, graphical representation regarding pseudo destination and path creation are schematically depicted. Conventional robotics inspection considers prior knowledge of the inspection trajectory so that the robot can examine certain equipment or area of interests or avoid certain areas in a factory. The prior knowledge can be naturally provided as a number of pseudo destinations in the IMOMD-RRT* algorithm. A pseudo destination may be a phony destination to help IMOMD-RRT* algorithm to form a connected graph but the pseudo destination may be rewired so they may no longer be visited. In some embodiments, the order of the pseudo destinations may be fixed. In other embodiments, the pseudo destinations may be objectives that are not removed in the rewiring process, as discussed in greater detail herein.

For example, FIG. 6A graphically illustrates how the path $\pi$ 602 (illustrated by the various hatching) starting from $d_1$ and terminating at $d_4$ is determined depending on whether objectives $d_2$ and $d_3$ are pseudo-destination. As illustrated in FIG. 6A, the path has a constraint of visiting all of the objectives 306. As such, the path $\pi$ visits the destinations in order of $d_1 \rightarrow d_2 \rightarrow d_3 \rightarrow d_4$ through the optimal connection nodes $C_{12}^*$, $C_{23}^*$, and $C_{34}^*$. Each of the connection nodes $C_{12}^*$, $C_{23}^*$, and $C_{34}^*$ may be the connection nodes between trees. As such, the path $\pi$ 602 follows the connection nodes between the trees.

FIG. 6B graphically illustrates when pseudo-objectives $d_2$ and $d_3$ are provided as information to help find a path between $d_1$ and $d_4$. The visiting order of trees may be determined by solving a Dijkstra. The connection nodes $c_{12}$, $c_{23}$, and $c_{34}$ are respectively selected from a set of connection nodes $c_{12}$, $c_{23}$, and $c_{34}$ by comparing the path cost. As such, the path costs are used to select the path 604 (illustrated by various hatching) from the connection nodes $c_{12}$, $c_{23}$, and $c_{34}$ which results in a shorter path.

Now referring back to FIGS. 2, 3A-3D and 4A-4B and the example Algorithm 5 illustratively depicted in FIG. 15, the solver includes the advanced cheapest insertion algorithm and the genetic algorithm to solve the order of visiting the destination where each node may be visited more than once, known herein as the relaxed traveling salesman problem (R-TSP) in polynomial time. The R-TSP, as discussed herein, differs from conventional traveling salesperson problems in two aspects. First, nodes are allowed to be visited more than once and second there is the source node 302 and the target node 304. The R-TSP may use an ACI-Gen solver. The complexity of the solver is $O(N^3)$, where N is the cardinality of the destination set $\mathcal{D}$.

As discussed above, in graph theory, a path is a sequence of vertices in a graph, where consecutive vertices in the sequence are adjacent in the graph, and no vertex appears more than once in the sequence. Moreover, a graph is connected when there is a path between each pair of vertices. Once all the destinations form a connected graph, there exists a path $\pi$ that passes all destinations $\mathcal{D}$ (i.e., a connected graph). As such, the R-TSP applies because there is the source node 302, target node 304, and the plurality of objectives 306 to be visited.

It should be understood that the connected graph 404 is formed when all the destinations and the paths found by the IMOMD-RRT* algorithm, which may mean starting from any objective 306, it is possible to reach any other destination or objective 306. As such, the IMOMD-RRT* algorithm forms the connected weighted-undirected graph 300 that may have multiple paths between each of the plurality of destinations 306 and between the source 302 and the target 304.

The advanced cheapest insertion algorithm includes a set of actions $\Lambda$: an in-place insertion $\lambda_{in\text{-}place}$, an in-sequence insertion $\lambda_{in\text{-}sequence}$, a swapping insertion $\lambda_{swapping}$, and a path refinement, as discussed in greater detail below.

Let the current sequence be $S_{current} = \{v_s, s_1, \ldots s_i, d_k, s_i, s_{i+1}, \ldots, s_n, v_t\}$ to indicate the visiting order of destinations, where $s_{\{\cdot\}} \in \mathcal{D}$. The travel cost $\theta(\cdot, \cdot)$ is the path distance between two destinations provided by the IMOMD-RRT* algorithm. Denote K the set of destinations to be inserted. Let the to-be-inserted destination be $d_k$ and its ancestor be $s_i$, where $d_k \in K$ and $s_i \in S_{current}$. Given a current sequence $S_{current}$, the location to insert $s^*$, the to-be-inserted destination $d^*$ and the action of the insertion $\lambda^*$ is determined by Equation 5:

$$\lambda^*, s^*, d^* = \underset{\substack{\lambda_j \in \Lambda \\ d_k \in \mathcal{K} \\ s_i \in S_{current}}}{\arg\min} \lambda_j(s_i, d_k) \quad (5)$$

where $\Lambda$ is the set of the insertion actions.

Referring now to FIG. 7A, the in-place insertion $\lambda_{in\text{-}place}$ detours from $s_i$ to $s_k$, and the resulting sequence is $S_{modified} = \{v_s, s_1, \ldots s_i, d_k, s_{i+1}, \ldots, s_n, v_t\}$. The insertion distance is defined by Equation 6:

$$\lambda_{in\text{-}place}(s_i, d_k) = 2\theta(s_i, d_k) \quad (6)$$

Referring now to FIG. 7B, the in-place insertion sequence $\lambda_{in\text{-}sequence}$ inserts $d_k$ between $s_1$ and $s_{i+1} (\forall s_i \in \{S_{current}/v_t\})$, and the resulting sequence is $S_{modified} = \{v_s, s_1, \ldots s_i, d_k, s_{i+1}, \ldots, s_n, v_t\}$. The insertion distance is determined by Equation 7:

$$\lambda_{in\text{-}sequence}(s_i, d_k) = \theta(s_i, d_k) + \theta(d_k, s_{i+1}) - \theta(s_i, s_{i+1}) \quad (7)$$

The swapping insertion changes the order of nodes right next to the newly inserted node. There are three cases in swapping insertion: swapping left, right, or both. For the case of swapping left, the modified sequence is $S_{modifed}=\{v_s, s_1, \ldots s_{i-2}s_i, s_{i-1}, d_k, s_{i+1}, \ldots, s_n, v_t\}$ by inserting $d_k$ between $s_i$ and $s_{i+1}(\forall s_i \in \{S_{current}/v_s, s_1\})$, and then swapping $s_i$ and $s_{i-1}$. The insertion distance of swapping left is determined by Equation 8:

$$\lambda_{swapping\ (left)}(s_i, d_k)=\theta(d_k, s_{i+1})-\theta(s_i, s_{i+1})+\theta(s_{i-1}, d_k)+\theta(s_{i-2}, s_i)-\theta(s_{i-2}, s_{i-1}) \quad (8)$$

For the case of swapping right, the modified sequence is $S_{modifed}=\{v_s, s_1, \ldots d_k, s_{i+2}, s_{i+1}, s_{i+3} \ldots, s_n, v_t\}$ by inserting $d_k$ between $s_i$ and $s_{i+1}(\forall s_i \in \{S_{current}/v_t, s_n\})$, and then swapping $s_{i+1}$ and $s_{i+2}$. The insertion distance of swapping left is determined by Equation 9:

$$\lambda_{swapping\ (right)}(s_i, d_k)=\theta(s_i, d_k)-\theta(s_i, s_{i+1})+\theta(d_k, s_{i+2})+\theta(s_{i+1}, s_{i+3})-\theta(s_{i+2}, s_{i+3}) \quad (9)$$

For the case of swapping both, the modified sequence is $S_{modifed}=\{v_s, s_1, \ldots s_{i-2}, s_i, s_{i-1}, d_k, s_{i+2}, s_{i+1}, s_{i+3} \ldots, s_n, v_t\}$ by inserting $d_k$ between $s_i$ and $s_{i-1}(\forall s_i \in \{S_{current}/v_s, v_t, s_1, s_n,\})$, and then swapping $s_i$ and $s_{i-1}$ and swapping $s_{i+1}$ and $s_{i+2}$. The insertion distance of swapping both is determined by Equation 10:

$$\lambda_{swapping\ (both)}(s_i, d_k)=\theta(s_{i-1}, d_k)+\theta(s_{i-2}, s_i)-\theta(s_{i-2}, s_{i-1})-\theta(s_i, s_{i+1})+\theta(d_k, s_{i+2})+\theta(s_{i+1}, s_{i+3})-\theta(s_{i+2}, s_{i+3}) \quad (10)$$

The in-place insertion may occur when the graph is not cyclic or the triangular inequality does not hold on the graph. The in-place insertion may generate redundant revisited nodes in final results and lead to a longer path such as a dual path 702 illustrated in FIG. 7A. As such, the path is further refined by the execution of the example Algorithm 6, illustratively depicted in FIG. 16. The refined path $\mathcal{P}_{ACI}$ of the advanced cheapest insertion process is the input to the genetic algorithm, as discussed in greater detail herein. The result is only a single path 704. As illustrated in FIG. 7B.

In operation, the ACI-Gen solver, executed in example Algorithm 5, illustratively depicted in FIG. 15, leverages the Dijkstra algorithm to find a sequence S from the source 302 ($v_s$) to the target 304 ($v_t$). During each iteration, an unexplored destination that has the minimum distance, will be inserted to the sequence S. The algorithm continues to run and have iterations until each of the plurality of destinations 306 are inserted into the sequence S (i.e., $|S|$ are not always the same with $|\mathcal{D}|$), as discussed in greater detail below.

Figure 8A:
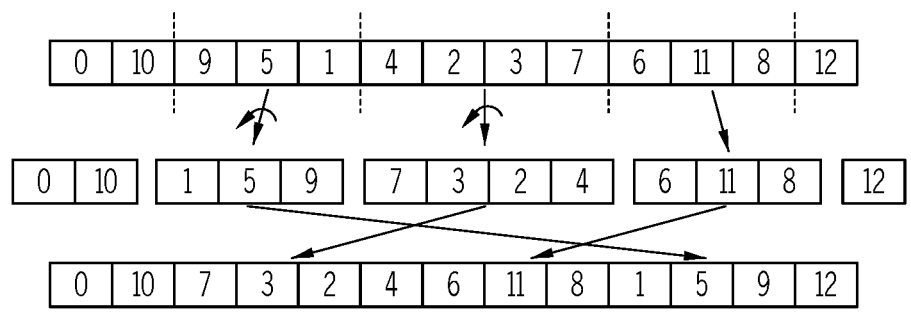
FIG. 8A schematically depicts a graphical representation of a mutation in a genetic algorithm of a solver according to one or more embodiments shown and described herein.
Figure 8B:
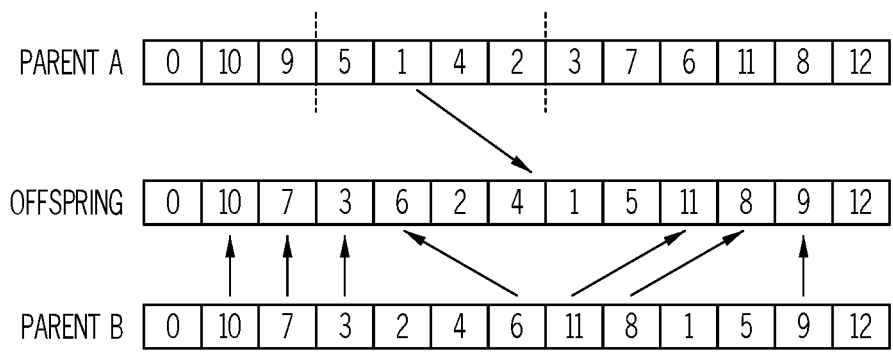
FIG. 8B schematically depicts a graphical representation of a crossover in the genetic algorithm of the solver of FIG. 8A according to one or more embodiments shown and described herein.

Now referring to FIGS. 8A-8B, a graphical representation of a mutation process and a crossover process are schematically depicted. The result from the advanced cheapest insertion may find a sub-optimal path that guarantees less than twice as small as the optimal solution. The genetic algorithm may be used to find improved path solutions, or refine the path. The genetic algorithm includes the mutation and the crossover process. With respect to mutation, the genetic algorithm may select a parent generate a new sequence by mutation or crossover to generate offspring or children. As randomly generating sequences is inefficient because of non-optimal solutions, sub-optimal results from advanced cheapest insertion are used, as described in greater detail herein.

The ordered sequence $S_{ACI}$ from the advanced cheapest insertion is used as the first parent and only parent. As described in greater detail herein, the mutation process to the parent to produce multiple offspring. Only the offspring with a lower cost than the parent are stored and the remaining offspring are the parents for the crossover process, as discussed in greater detail herein.

As illustrated in FIG. 8A, the mutation process may include three steps. First, the sequence from the advanced cheapest insertion may be randomly divided into three to five segments, such as ($3 \le k \le 5$). Second, each segment except first and last segment that contains the source 302 and the target 304, may be randomly executed using inversion. Third, the segments in the middle may be randomly reordered and spliced together.

That is, the crossover process includes two sequences (e.g., parent A and parent B) picked from the offspring from the mutation process. A segment of one of the two sequences is randomly selected. Random inversion is performed on the segment and the resulting segment is randomly placed inside an empty sequence of the offspring. The remaining elements of the offspring are filled by the order of the other sequence except the elements that are already in the offspring sequence.

The resulting sequence is an offspring of the parent. Let the resulting sequence of the offspring be $\psi=\{v_s, p_1, p_2, \ldots, p_n, v_t\}$ where $v_s$ is the source node 302, $v_t$ is the target node 304, n is the number of objectives, and $\{p_i\}_{i=1}^n$ is the re-ordered objective. The cost $\Theta$ of the offspring is computed by Equation 11:

$$\Theta=\theta(v_s, p_1)+\Sigma_{i=1}^n\theta(p_i, p_{i+1})+\theta(p_n, v_t) \quad (11)$$

where $\theta(\bullet, \bullet)$ is the path distance between two destinations provided by the IMOMD-RRT* algorithm. Sequences from mutation are saved in the data storage device 916 (FIG. 9A) with their cost to utilize in the crossover step. Moreover, the mutation process is performed continuously and an indefinite number of times resulting in a plurality of offspring in which only the lower cost offspring are saved for the crossover process.

With reference to FIG. 8B, the crossover process is a method that combines the sub-path of two sequences to generate new offspring or children. Let the set of mutated paths from the mutation process be $\Psi=\{\psi\}_{i=1}^k\psi$ where k is the number of remaining offspring. The crossover process combines sub-paths of any two sequences ($\psi_i, \psi_j \in \Psi$) to generate a new offspring, as illustrated in FIG. 8B. To perform the crossover, a segment of one of the two sequences is randomly selected. Second, a random inversion is performed on the segment. The resulting segment is randomly placed inside an empty sequence of the offspring. The remaining elements of the offspring are filled by the order of the other sequence except the elements that are already in the offspring sequence.

For each generation, the crossover process is performed an infinite number of times and only the offspring with the lower cost than the previous generation are kept. After a few generation, the lowest cost offspring $S_{refined}$ is the final sequence of the path $S_{aci}$. Let the fitness $\rho_i$ of the path $\psi_i$ be the inverse of the cost $\Theta_i$ of Equation 11 as defined in Equation 12:

$$\rho_i = \frac{1}{\Theta_i} \quad (12)$$

The possibility of the path $\psi_i$ being selected is determined from Equation 13:

$$P_\psi(\psi=\psi_i) = \frac{\rho_i}{\sum_{i=1}^w \rho_i} \quad (13)$$

where w is the number of the entire remaining offspring from each generation.

For each generation, the crossover process is performed continuous and an infinite number of times and only the offspring that have lower costs than the previous generation are kept. After a few generations, the lowest cost offspring $S_{refined}$ is the final sequence of the path $S_{aci}$.

Still referring to FIG. 8B, the crossover process includes two sequences (e.g., parent A and parent B) picked from the offspring from the mutation process. A segment of one of the two sequences is randomly selected. Random inversion is performed on the segment and the resulting segment is randomly placed inside an empty sequence of the offspring. The remaining elements of the offspring are filled by the order of the other sequence except the elements that are already in the offspring sequence.

Figure 9A:
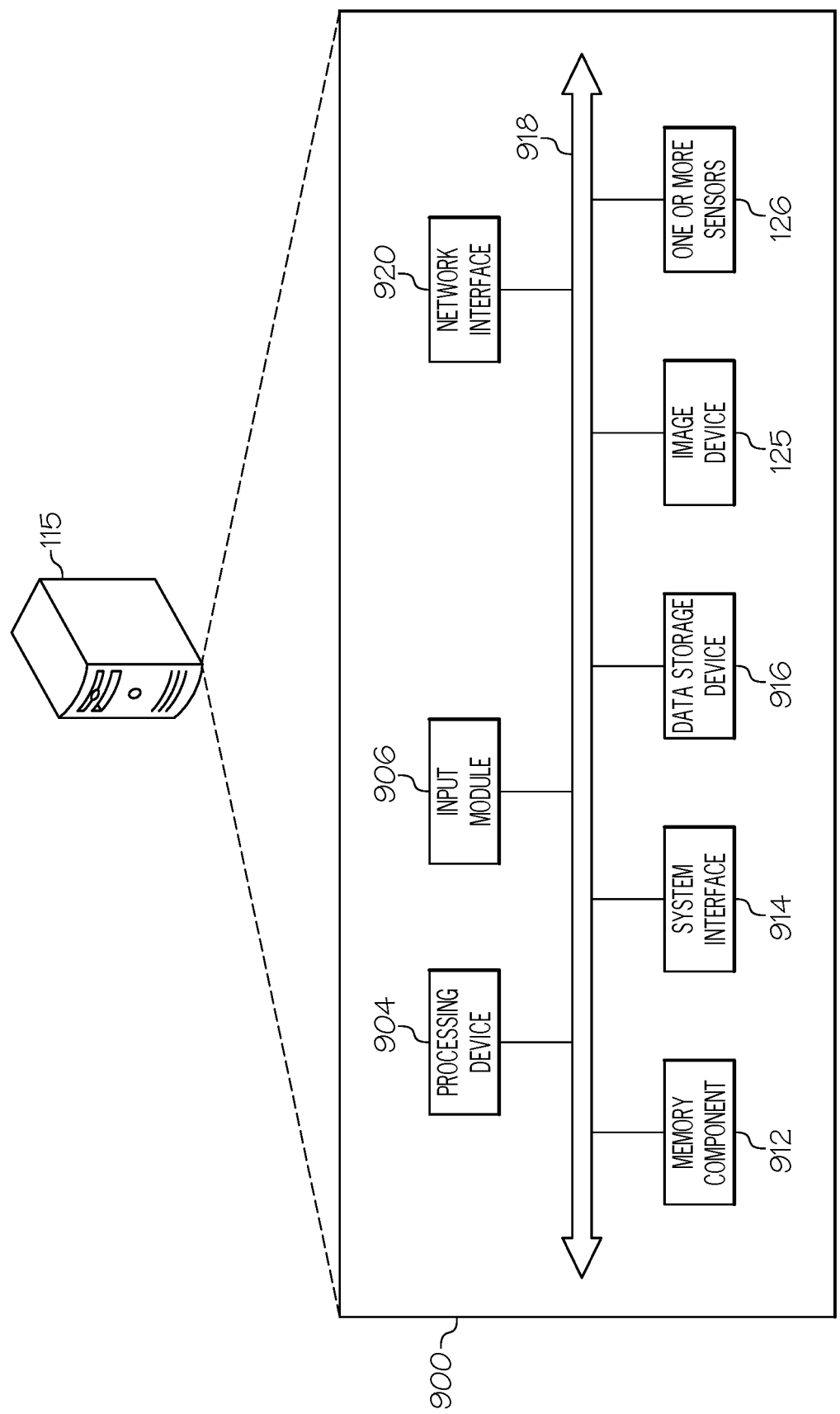
FIG. 9A schematically depicts illustrative hardware components of a control module that may be used in the route planning system according to one or more embodiments shown and described herein.

Now referring to FIG. 9A, illustrative hardware components of the server computing device 115 that may be used in data creation for path planning, analyzing historical or current data, and outputting at least the connected graph 402 is schematically depicted. While the components depicted in FIG. 9A are described with respect to the server computing device 115, it should be understood that similar components may also be used for the user computing device 120 (FIG. 1) and/or the vehicular and/or robotics application devices 110 (FIG. 1) without departing from the scope of the present disclosure.

The server computing device 115 may include a control module 900 having a non-transitory computer-readable medium for completing the various processes described herein, embodied as hardware, software, and/or firmware, according to embodiments shown and described herein. As such, the control module 900 may be an electronic control unit or a central processing unit (CPU). While in some embodiments the control module 900 may be configured as a general purpose computer with the requisite hardware, software, and/or firmware, in other embodiments, the control module 900 may also be configured as a special purpose computer designed specifically for performing the functionality described herein. For example, the control module 900 may be a device that is particularly adapted to utilize algorithms for the determining path planning, calculating optimal paths, and/or the like. In another example, the control module 900 may be a device that is particularly adapted to utilize algorithms for the purposes of improving functionality of the route planning system 100 by determining all the particular routes between target, source and the plurality of destinations and determining the solution path including the visiting order. Other uses of the algorithms described herein provide reuse of explored information or data following a change in destination or objectives to efficiently find new solution paths connecting the destinations and the visiting order.

In embodiments where the control module 900 is a general purpose computer, the systems and methods described herein provide a mechanism for improving functionality by determining on a weighted, connected and undirected graph, at least one path or route between a target node and a source node that includes visiting at least all of the plurality of destinations and then determine the visiting order to maximize efficiency for autonomous vehicle and robotic applications. Further, the systems and methods described herein provide a mechanism for improving functionality in robotics inspection, where an ordered list of inspection way-points is often provided so that the robot can preferentially examine certain equipment or area of interests or avoid certain areas in a factory, for example.

Still referring to FIG. 9A, in some embodiments, the control module 900 may be remote from vehicular and/or robotics application devices 110 (FIG. 1). In other embodiments, the control module 900 may generally be an onboard computing system. In some embodiments, the control module 900 may be a plurality of computing systems.

As also illustrated in FIG. 9A, the control module 900 may include one or more processing devices 904, an input module 906, a network interface hardware 920, a non-transitory memory component 912, a system interface 914, a data storage device 916, the image capturing device 125 and the one or more sensors 126. A local interface 918, such as a bus or the like, may interconnect the various components.

The one or more processing devices 904, such as a computer processing unit (CPU), may be the central processing unit of the control module 900, performing calculations and logic operations to execute a program. The one or more processing devices 904, alone or in conjunction with the other components, is an illustrative processing device, computing device, processor, or combination thereof. The one or more processing devices 904 may include any processing component configured to receive and execute instructions (such as from the data storage device 916 and/or the memory component 912).

The memory component 912 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 912 may include one or more programming instructions thereon that, when executed by the one or more processing devices 904, cause the one or more processing devices 904 to complete various processes, such as the processes described herein with respect to FIGS. 10A-10B. Still referring to FIG. 9A, the programming instructions stored on the memory component 912 may be embodied as a plurality of software logic modules, where each logic module provides programming instructions for completing one or more tasks, as described in greater detail below with respect to FIG. 9B.

The input module 906 may include tactile input hardware (i.e. a joystick, a knob, a lever, a button, etc.) that allows a user, such as an occupant, to input settings such as activating or deactivating the image capturing device 125, the one or more sensors 126, and/or the like. In some embodiments, a button or other electrically coupled input device may be communicatively coupled to the route planning system 100 (FIG. 1) such that when the button or other input device is activated (i.e., touched, moved, etc.), the one or more processing devices 904 execute logic stored on the memory component 912 to activate the route planning system 100 (FIG. 1). It should be appreciated that the input device may be a keyboard, a mouse, a joystick, a touch screen, a remote control, a pointing device, a video input device, an audio input device, a haptic feedback device, and/or the like.

The network interface hardware 920 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 920 may provide a communications link between the server computing device 115 and the other components of the route planning system

100 depicted in FIG. 1, including (but not limited to) the vehicular and/or robotics application devices 110.

Still referring to FIG. 9A, the data storage device 916, which may generally be a storage medium, may contain one or more data repositories for storing data that is received and/or generated. The data storage device 916 may be any physical storage medium, including, but not limited to, a hard disk drive (HDD), memory, removable storage, and/or the like. While the data storage device 916 is depicted as a local device, it should be understood that the data storage device 916 may be a remote storage device. Illustrative data that may be contained within the data storage device 916 is described below with respect to FIG. 9C. It should be appreciated that the amount of available storage space in the data storage device 916 may be limited due to its location in the control module 900 in some embodiments. As such, it may be necessary to minimize the size of the data stored thereon, as described in greater detail herein.

The system interface 914 may generally provide the control module 900 with an ability to interface with one or more external devices such as, for example, the user computing device 120 and/or the vehicular and/or robotics application devices 110 depicted in FIG. 1. Communication with external devices may occur using various communication ports (not shown) and/or via the local interface 918. An illustrative communication port may be attached to a communications network.

Still referring to FIG. 9A, the image capturing device 125 may be communicatively coupled to the local interface 918 and coupled to the one or more processing devices 904 via the local interface 918. The image capturing device 125 may be any imaging device, sensor, or detector that is suitable for obtaining images. As used herein, the term "images" or "image" refers to video images (i.e., a sequence of consecutive images), still images (including still images isolated from video images), and/or image data.

The one or more sensors 126 may be communicatively coupled to the local interface 918 and coupled to the one or more processing devices 904 via the local interface 918. The one or more sensors 126 may be any imaging device, sensor, or detector that is suitable for obtaining images and/or gathering information/data in the environment surrounding the vehicular and/or robotics application devices 110.

Figure 9B:
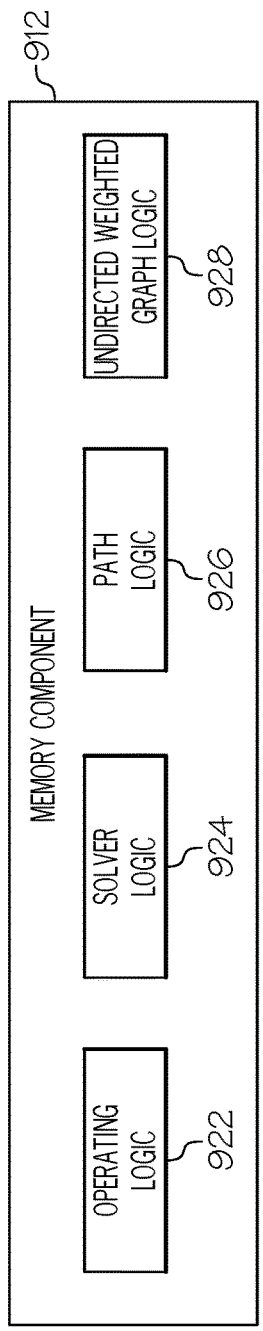
FIG. 9B schematically depicts an illustrative memory component containing illustrative logic components according to one or more embodiments shown and described herein.

With reference to FIG. 9B, in some embodiments, the program instructions contained on the memory component 912 may be embodied as a plurality of software modules, where each module provides programming instructions for completing one or more tasks. For example, FIG. 9B schematically depicts the memory component 912 containing illustrative logic components according to one or more embodiments shown and described herein. As shown in FIG. 9B, the memory component 912 may be configured to store various processing logic, such as, for example, operating logic 922, solver logic 924, path logic 926, and undirected weighted graph logic 928 (each of which may be embodied as a computer program, firmware, or hardware, as an example). The operating logic 922 may include an operating system and/or other software for managing components of the control module 900 (FIG. 9A). Further, the operating logic 922 may contain one or more software modules for receiving data, transmitting data, and/or analyzing data.

Still referring to FIG. 9B, the solver logic 924 may contain one or more software modules and/or programming instructions for processing and analyzing data, executing algorithms, such as those illustratively depicted in at least FIGS. 11-16, collecting data from one or more graphs, and determining a vising order between the source, the target and the plurality of destinations, as described in greater detail herein. The solver logic 924 may reside on different computing devices. The solver logic 924 is further configured to perform the functionality as described herein and the illustrative methods of FIGS. 10A-10B.

The path logic 926 may contain one or more software modules and/or programming instructions for processing and analyzing data, executing algorithms, such as those illustratively depicted in at least FIGS. 11-16, to perform the path analysis by executing the IMOMD-RRT* algorithm to for multi-objective planning by growing a tree or reusing the explored tree even after the change of destinations, as discussed in greater detail herein. The path logic 926 is further configured to perform the functionality as described herein and the illustrative methods of FIGS. 10A-10B.

The undirected weighted graph logic 928 may contain one or more software modules and/or programming instructions for processing and analyzing data, executing algorithms, such as those schematically depicted in at least FIGS. 11-15, to perform graph analysis, on real-time, real world, graphs that include topographical features, and edit the graphs to include the target, the source and the plurality of destinations, as discussed in greater detail herein. The undirected weighted graph logic 928 is further configured to perform the functionality as described herein and the illustrative methods of FIGS. 10A-10B.

Figure 9C:
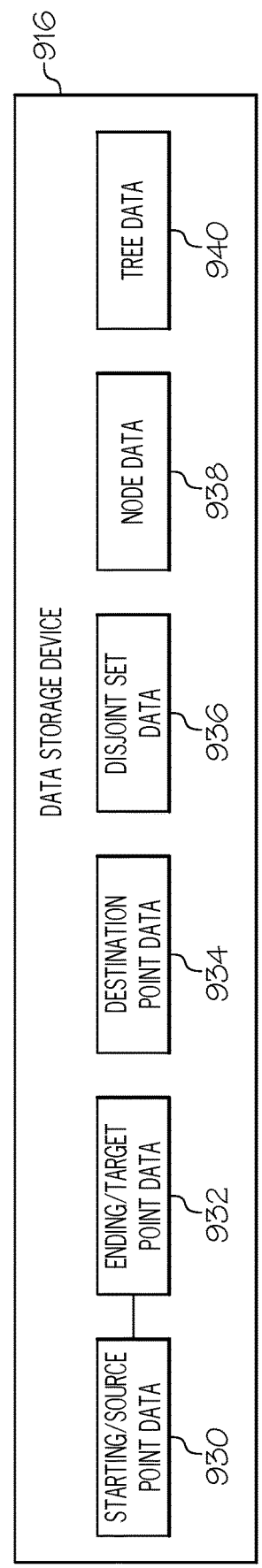
FIG. 9C schematically depicts an illustrative data storage device containing illustrative data components according to one or more embodiments shown and described herein.

FIG. 9C schematically depicts a block diagram of various data contained within a storage device (e.g., the data storage device 916). As shown in FIG. 9C, the data storage device 916 may include, for example, a starting/source point data 930 and ending/target point data 932, and a plurality of destinations point data 934, which may also include objective data or various waypoint data. The starting/source point data 930 and ending/target point data 932 may be fixed data points, but the plurality of destinations point data 934 may continuously change and update such as in car-sharing or ride pooling applications. Further, it should be understood that the starting/source point data 930, the ending/target point data 932, and/or the plurality of destinations point data 934 may be based on need or vehicle gathered data (real) or an engineering data (synthetic) and maybe received from various sources including from the vehicular and/or robotics application devices 110 (FIG. 1) or received from, for example, other methods such as the image capturing device 125 or the one or more sensors 126 (FIG. 1). Further, the destination point data may further include pseudo-destinations, which are destinations provided as information to help find the path but may not be visited.

The data storage device 916 may further include, for example, disjoint set data 936, which may include data directed to connectivity of the graph and includes data relating to example Algorithm 2-4 illustratively depicted in FIGS. 12-15, respectively. The node data 938 of the data storage device 916 may include data relating to the node sequence, an insertion plan, swapping insertion, random nodes, parent candidates, expandable nodes, and/or the like. Further, the node data 938 may contain data needed to perform or execute the example Algorithms 1-6 illustratively depicted in FIGS. 11-16, respectively. The data storage device 916 may further include, for example, tree data 940, which may include data concerning trees grown from the pseudo destinations, merged trees data, tree expansion data, explored or visited tree data, and/or the like. Further, the tree data 940 may contain data needed to perform or execute the example Algorithms 1-6 illustratively depicted in FIGS. 11-16, respectively.

It should be understood that the components illustrated in FIGS. 9A-9C are merely illustrative and are not intended to limit the scope of this disclosure. More specifically, while the components in FIGS. 9A-9C are illustrated as residing within the control module 900 of the server computing device 115, this is a non-limiting example. In some embodiments, one or more of the components may reside external to the control module 900 and/or the server computing device 115. Similarly, as previously described herein, while FIGS. 9A-9C are directed to the control module 900 of the server computing device 115, other components such as the user computing device 120 and vehicular and/or robotics application devices 110 (FIG. 1) may include similar hardware, software, and/or firmware.

Figure 10A:
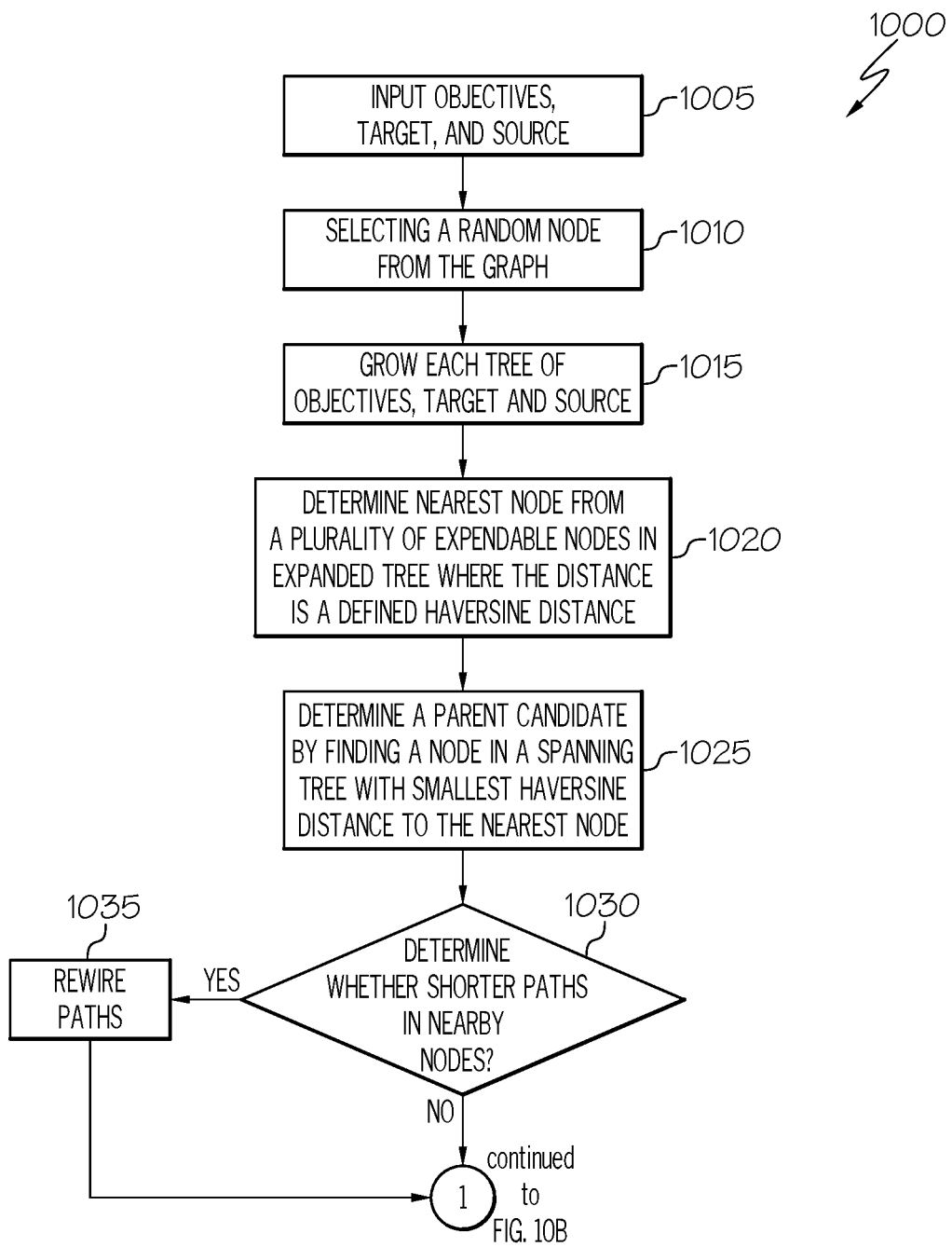
FIG. 10A depicts a flow diagram of an illustrative method of route planning performed by the route planning system of FIG. 1 according to one or more embodiments shown and described herein.
Figure 10B:
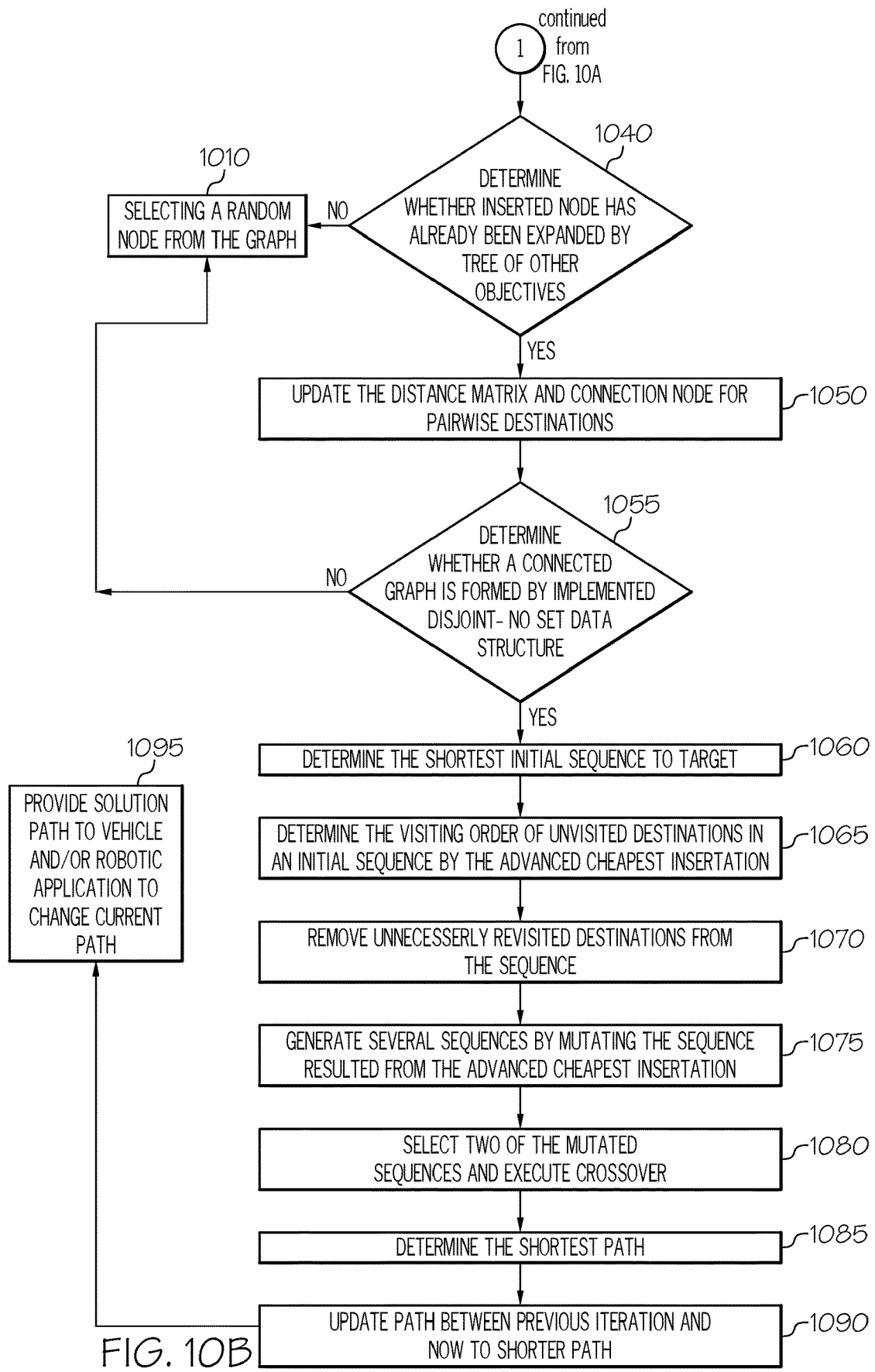
FIG. 10B depicts a continuation of the flow diagram of FIG. 8A according to one or more embodiments shown and described herein.

Referring now to FIGS. 10A-10B and also back to FIGS. 1-8B and 11-16, a flow diagram that graphically depicts an illustrative method 1000 for route planning performed by the route planning system 100 is schematically depicted. Although the steps associated with the blocks of FIGS. 10A-10B will be described as being separate tasks, in other embodiments, the blocks may be combined or omitted. Further, while the steps associated with the blocks of FIGS. 10A-10B will described as being performed in a particular order, in other embodiments, the steps may be performed in a different order.

At block 1005, the objectives, target and source are input into the route planning system. In some embodiments, the objectives, target and source are input directly onto a real-time topographical map. The map is a weighted and undirected graph having a plurality of nodes and a plurality of edges. At block 1010, the route planning system performs a sampling by picking a random node in the graph and growing a tree at each of the objectives, target and source, at block 1015. At block 1020, the route planning system determines a nearest node form the plurality of expendable nodes in the expanded tree where the distance is defined as a haversine distance.

At block 1025, a parent candidate is determined by finding a node in a spanning tree with the smallest haversine distance to the nearest node. The route planning system determines whether there exists shorter paths in nearby nodes, at block 1030. If a shorter path exists, at block 1030, then the route planning system rewires the paths at block 1035 and then continues to determine whether the inserted node has already been expanded by a tree of another objective, at block 1040. On the other hand, if a shorter path does not exist, at block 1030, then the system advances to block 1040, to determine whether the inserted node has already been expanded by a tree of another objective. If the inserted node has not already been expanded by the tree, then the method 1000 starts over at block 1010 with the route planning system performs a sampling by picking a random node in the graph. On the other hand, if the inserted node has already been expanded by the tree, then the distance matrix and connection node for pairwise destinations is updated, at block 1050.

At block 1055, the route planning system then determines whether a connected graph is formed by implementing the disjoint set data structure. If the graph is not formed by implemented disjoint set data, then the method 1000 starts over at block 1010 with the route planning system performs a sampling by picking a random node in the graph. If the graph is formed by implemented disjoint set data, the route planning system determines the shortest initial sequence to the target, at block 1060. At block 1065, the route planning system determines the visiting order of unvisited destinations in an initial sequence by the advanced cheapest insertion algorithm. The route planning system removes any unnecessarily revisited destinations from the sequence, at block 1070 and generates several sequences by mutating the sequence resulted from the advanced cheapest insertion algorithm, at block 1075.

At block 1080, the route planning system randomly selects two of the mutated sequences with probability computed by Equation 13 and executes a crossover to then determine the shortest past, at block 1085. The crossover process may be performed an indefinite number of times resulting in a plurality of offspring in which only the lowest cost offspring are returned. At block 1090, the solution path is updated between the previous iteration and the now shorter path. At block 1095, the new solution path on the map is provided or transmitted to the vehicular and/or robotics application devices 110 to alter or change the current path. That is, the vehicular and/or robotics application devices 110 will change the current path to the newly found path based on the newly provided solution path with the new shorter route and/or reduces the assigned travel cost asymptotically with an allocated computation time by making it possible to visit each of the plurality of objectives more than once and conforms with the order constraint. It should be understood that the method 1000 may be continuously performed with an indefinite number of iterations.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for a route planning performed by a route planning system, the method comprising:
inputting a source into a weighted and undirected graph having a plurality of nodes and a plurality of edges;
inputting a target into the weighted and undirected graph;
inputting a plurality of objectives into the weighted and undirected graph;
searching the weighted and undirected graph using a rapidly exploring random tree (RRT*) algorithm to determine a solution path that meets an existence constraint and an order constraint;
determining a plurality of paths between the source and the target that intersects with each one of the plurality of objectives at least once that conforms with the existence constraint;
assigning a travel cost for each of the determined plurality of paths;
determining a visiting order of the plurality of objectives that reduces the assigned travel cost for each of the plurality of objectives by asymptotically decreasing an allocated computation time making it possible to visit each of the plurality of objectives more than once; and
outputting the solution path to a mobile application that follows the solution path to traverse the source, the target and the plurality of objectives,
wherein the solution path connects the source, the target and the plurality of objectives to form a connected graph having the plurality of nodes in a real world application.

2. The method of claim 1, wherein the steps of determining the plurality of paths between the source and the target that intersects with each one of the plurality of objectives at least once, assigning the travel cost for each of the determined plurality of paths, and determining the visiting order of the plurality of objectives that reduces the assigned travel cost asymptotically with the allocated computation time is performed by a solver.

3. The method of claim 2, wherein the solver is an advanced modified cheapest insertion algorithm and a genetic algorithm solver that further includes an advanced cheapest insertion algorithm and a genetic algorithm for determining the plurality of paths, assigning the travel cost for each of the plurality of paths, and the visiting order in polynomial time.

4. The method of claim 1, wherein the RRT* algorithm performs a sampling by picking a random node from the weighted and undirected graph to grow a tree for each of the plurality of objectives, by extending a node from the plurality of nodes that has a plurality of expendable nodes.

5. The method of claim 4, wherein each of the plurality of expendable nodes exists when a node of the plurality of nodes has at least one unvisited node connect and at least one node of the tree connect.

6. The method of claim 4, wherein the RRT* algorithm determines a parent candidate by finding a node of the plurality of nodes in a spanning tree of an objective of the plurality of objectives, the parent candidate is the node that has a lowest cost from the spanning tree of the objective of the plurality of objectives.

7. The method of claim 6, wherein after the parent candidate is determined, determine a first path between the plurality of nodes and rewire adjacent nodes of the plurality of nodes when a second path is determined to be shorter in distance than the first path.

8. The method of claim 6, wherein the RRT* algorithm determines whether the node of the plurality of nodes belongs to more than one tree and once determined, stores the node and the associated trees are connected.

9. A route planning system comprising:
one or more processing devices;
one or more memory modules communicatively coupled to the one or more processing devices; and
machine readable instructions stored in the one or more memory modules that cause the route planning system to perform at least the following when executed by the one or more processing devices:
input a source into a weighted and undirected graph having a plurality of nodes and a plurality of edges;
input a target into the weighted and undirected graph;
input a plurality of objectives into the weighted and undirected graph;
search the weighted and undirected graph via a rapidly exploring random tree (RRT*) algorithm to determine a solution path that meets an existence constraint and an order constraint;
determine a plurality of paths between the source and the target that intersects with each one of the plurality of objectives at least once;
assign a travel cost for each of the determined plurality of paths;
determine a visiting order of the plurality of objectives that reduces the assigned travel cost asymptotically with an allocated computation time making it possible to visit each of the plurality of objectives more than once; and
output the solution path to a mobile application that follows the solution path to traverse the source, the target and the plurality of objectives,
wherein the solution path connects the source, the target and the plurality of objectives to form a connected graph having the plurality of nodes in a real world application.

10. The route planning system of claim 9, further comprising:
a solver configured to:
determine the plurality of paths between the source and the target that intersects with each one of the plurality of objectives at least once,
assign the travel cost for each of the determined plurality of paths, and
determine the visiting order of the plurality of objectives that reduces the assigned travel cost asymptotically with the allocated computation time.

11. The route planning system of claim 10, wherein the solver is an advanced modified cheapest insertion algorithm and a genetic algorithm solver that further includes:
an advanced cheapest insertion algorithm; and
a genetic algorithm,
wherein the advanced cheapest insertion algorithm and the genetic algorithm are configured to determine the plurality of paths, the assigned travel cost, and the visiting order in polynomial time.

12. The route planning system of claim 10, wherein the RRT* algorithm is configured to perform a sampling by picking a random node from the weighted and undirected graph to grow a tree for each of the plurality of objectives by extending a node from the plurality of nodes that has a plurality of expendable nodes.

13. The route planning system of claim 12, wherein each of the plurality of expendable nodes exists when at least one unvisited node connect and at least one node of the tree connect.

14. The route planning system of claim 12, wherein the RRT* algorithm is further configured to determine a parent candidate by finding a node of the plurality of nodes in a spanning tree of an objective of the plurality of objectives, the parent candidate is the node that has a lowest cost from the spanning tree of an objective of the plurality of objectives.

15. The route planning system of claim 14, wherein after the parent candidate is determined, the RRT* algorithm is further configured to determine a first path between the plurality of nodes and rewire adjacent nodes of the plurality of nodes when a second path is determined to be shorter in distance than the first path.

16. The route planning system of claim 15, wherein the RRT* algorithm is further configured to determine whether the node of the plurality of nodes belongs to more than one tree, and once determined, stores the node and the trees that are connected.

17. A system comprising:
one or more processing devices;
one or more memory modules communicatively coupled to the one or more processing devices; and
machine readable instructions stored in the one or more memory modules that cause the system to perform at least the following when executed by the one or more processing devices:
input a source into a weighted and undirected graph having a plurality of nodes and a plurality of edges;
input a target into the weighted and undirected graph;
input a plurality of objectives into the weighted and undirected graph;
search the weighted and undirected graph via a rapidly exploring random tree (RRT*) algorithm where the RRT* algorithm is configured to perform a sampling by picking a random node in the graph to grow a tree for each of the plurality of objectives, by extending a node from the plurality of nodes that has a plurality of expendable nodes to determine a solution path that meets an existence constraint and an order constraint;

determine, via the RRT* algorithm, a plurality of paths between the source and the target that intersects with each one of the plurality of objectives at least once;

assign, via a solver, a travel cost for each of the determined plurality of paths;

determine, via the solver, a visiting order of the plurality of objectives that reduces the assigned travel cost by asymptotically decreasing an allocated computation time thereby making it possible to visit each of the plurality of objectives more than once; and output the solution path connects the source, the target and the plurality of objectives to form a connected graph to a mobile application that follows the solution path to traverse the source, the target and the plurality of objectives.

18. The system of claim 17, wherein the solver is an advanced modified cheapest insertion algorithm and a genetic algorithm solver that further includes:
an advanced cheapest insertion algorithm; and
a genetic algorithm,
wherein the advanced cheapest insertion algorithm and the genetic algorithm are configured to determine the plurality of paths, the assigned travel cost for each of the plurality of paths, and the visiting order in polynomial time.

19. The system of claim 17, wherein the RRT* algorithm is configured to:
determine a parent candidate by finding a node of the plurality of nodes in a spanning tree of an objective of the plurality of objectives, the parent candidate is a node that has a lowest cost from the spanning tree of an objective of the plurality of objectives,
wherein each of the plurality of expendable nodes exists when a node has at least one unvisited node connected and at least one node of the tree connected.

20. The system of claim 19, wherein:
after the parent candidate is determined, the RRT* algorithm is further configured to determine a first path between the plurality of nodes and rewire adjacent nodes of the plurality of nodes when a second path is determined to be shorter in distance than the first path, and
determine whether the node of the plurality of nodes belongs to more than one tree and once determined, stores the node and the trees that are connected.

* * * * *

UNITED STATES PATENT AND TRADEMARK OFFICE
CERTIFICATE OF CORRECTION

PATENT NO. : 12,104,910 B2
APPLICATION NO. : 17/733654
DATED : October 1, 2024
INVENTOR(S) : Jiunn-Kai Huang et al.

Page 1 of 1

It is certified that error appears in the above-identified patent and that said Letters Patent is hereby corrected as shown below:

On the Title Page

Item (73), assignee 2, city, delete "Toyota" and insert --Toyota-shi Aichi-ken--, therefor.

In page 2, Column 2, item (56), other publications, cite no. 1, delete "wit" and insert --with--, therefor.

In the Drawings

In sheet(s) 13 of 18, figure 10B, block 1070, delete "UNNECESSERLY" and insert --UNNECESSARILY--, therefor.

In the Specification

In Column 9, Line(s) 67, delete "$\mathcal{D} = \{d_i d_i \in \{v_s, v_t\} \cup O\}$" and insert --$\mathcal{D} = \{d_i \mid d_i \in \{v_s, v_t\} \cup O\}$--, therefor.

In Column 10, Line(s) 32, after "$X_{new}$", delete --,--.

In Column 13, Line(s) 15, delete "$S_{1+1}$ and $S_{1+2}$" and insert --$S_{i+1}$ and $S_{i+2}$--, therefor.

In Column 14, Line(s) 22, delete "$\{pi\}_{i=1}^n$" and insert --$\{pi\}_{i=1}^n$--, therefor.

In Column 14, Line(s) 25, delete "$\Theta = \theta(v_s, p_1) + \Sigma_{i=1}^n \theta(p_i, p_{i+1}) + (p_n, v_t)$" and insert --$\Theta = \theta(v_s, p_i) + \Sigma_{i=1}^n \theta(p_i, p_{i+1}) + (p_n, v_t)$--, therefor.

In Column 14, Line(s) 37, delete "$\psi = \{\psi\}_{i=1}^k \psi$" and insert --$\psi = \{\psi\}_{i=1}^k \psi$--, therefor.

Signed and Sealed this
Eleventh Day of February, 2025

Coke Morgan Stewart
*Acting Director of the United States Patent and Trademark Office*